United States Patent
Yamasaki et al.

(10) Patent No.: US 6,261,456 B1
(45) Date of Patent: Jul. 17, 2001

(54) WASTE WATER TREATMENT METHOD AND WASTE WATER TREATMENT EQUIPMENT CAPABLE OF TREATING WASTE WATER CONTAINING FULUORINE, NITROGEN AND ORGANIC MATTER

(75) Inventors: Kazuyuki Yamasaki, Hiroshima; Kazuyuki Sakata, Fukuyama, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/342,503

(22) Filed: Jun. 29, 1999

(30) Foreign Application Priority Data

Jun. 30, 1998 (JP) ................................. 10-183986

(51) Int. Cl.[7] ................................. C02F 3/30; C02F 1/44
(52) U.S. Cl. .......................... 210/605; 210/610; 210/614; 210/615; 210/617; 210/631; 210/652; 210/195.1; 210/195.2; 210/205; 210/900; 210/903; 210/908; 210/915
(58) Field of Search ................................. 210/605, 610, 210/615–617, 631, 650, 652, 614, 623, 150, 195.1, 195.2, 205, 206, 900, 903, 908, 915

(56) References Cited

U.S. PATENT DOCUMENTS

| | | | |
|---|---|---|---|
| 4,256,573 | * | 3/1981 | Shimodaira . |
| 4,765,900 | * | 8/1988 | Schwoyer et al. . |
| 4,917,802 | * | 4/1990 | Fukaya et al. . |
| 4,933,076 | * | 6/1990 | Oshima et al. . |
| 5,288,407 | * | 2/1994 | Bodwell et al. . |
| 5,423,988 | * | 6/1995 | Yamasaki et al. . |
| 5,462,666 | * | 10/1995 | Kimmel . |
| 5,580,458 | * | 12/1996 | Yamasaki et al. . |
| 5,670,046 | * | 9/1997 | Kimmel . |
| 5,702,604 | * | 12/1997 | Yamasaki et al. . |
| 6,063,279 | * | 5/2000 | Yamasaki et al. . |

FOREIGN PATENT DOCUMENTS

| | | |
|---|---|---|
| 8-141597 | 6/1996 | (JP) . |
| 10-080693 | 3/1998 | (JP) . |

* cited by examiner

*Primary Examiner*—David A. Simmons
*Assistant Examiner*—Fred Prince
(74) *Attorney, Agent, or Firm*—Nixon & Vanderhye

(57) ABSTRACT

Waste water containing fluorine, nitrogen and organic matter is treated by introducing the waste water into a water tank filled with calcium carbonate mineral and anaerobic microorganic sludge. An upper portion of the water tank is occupied by the anaerobic microorganic sludge concurrently with natural precipitation of the calcium carbonate mineral toward a lower portion of the water tank. Calcium ions dissolving from the calcium carbonate mineral precipitated in the lower portion of the water tank are made to chemically react with the fluorine in the waste water. At the same time, the organic matter in the waste water is treated by utilizing anaerobic microorganisms in the anaerobic microorganic sludge in the upper portion of the water tank. The nitrogen in the waste water is treated to be reduced by reducibility that the anaerobic microorganisms in the waste water own. There is thus provided the waste water treatment method and waste water treatment equipment capable of treating the waste water containing fluorine, nitrogen and organic matter at low cost without necessitating the organic matter such as methanol as an additional chemical.

16 Claims, 16 Drawing Sheets

Fig.2A  WHEN CONCENTRATIONS OF NITROGEN, ORGANIC MATTER AND FLUORINE ARE NORMAL

| TANK | | RETENTION TIME [HOUR] | \multicolumn{15}{c}{TIMING (ELAPSED TIME) [HOUR]} |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| SECOND WATER TANK | UPPER PORTION | 2 | | — | | | | | | | | | | | | | |
| | LOWER PORTION | 2 | | | | — | | | | | | | | | | | |
| THIRD WATER TANK | | 2 | | | | | — | | | | | | | | | | |
| SEPARATION CHAMBER | | 0.5 | | | | | | | — | | | | | | | | |
| FOURTH WATER TANK | | 3 | | | | | | | | —— | | | | | | | |
| FIFTH WATER TANK | | 5 | | | | | | | | | | ——— | | | | | |

Fig.2B  WHEN CONCENTRATIONS OF NITROGEN, ORGANIC MATTER AND FLUORINE ARE LOW

| TANK | | RETENTION TIME [HOUR] | \multicolumn{15}{c}{TIMING (ELAPSED TIME) [HOUR]} |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| SECOND WATER TANK | UPPER PORTION | 1 | — | | | | | | | | | | | | | | |
| | LOWER PORTION | 1 | | | — | | | | | | | | | | | | |
| THIRD WATER TANK | | 1 | | | | — | | | | | | | | | | | |
| SEPARATION CHAMBER | | 0.25 | | | | | — | | | | | | | | | | |
| FOURTH WATER TANK | | 3 | | | | | | — | | | | | | | | | |
| FIFTH WATER TANK | | 5 | | | | | | | | —— | | | | | | | |

US 6,261,456 B1

WASTE WATER TREATMENT METHOD AND WASTE WATER TREATMENT EQUIPMENT CAPABLE OF TREATING WASTE WATER CONTAINING FULUORINE, NITROGEN AND ORGANIC MATTER

BACKGROUND OF THE INVENTION

The present invention relates to a waste water treatment method and waste water treatment equipment for concurrently treating in one tank fluorine, nitrogen, organic matter and the like in waste water discharged from a semiconductor plant or a liquid crystal plant.

In a semiconductor plant or a liquid crystal plant, a large amount of organic matter such as IPA (isopropyl alcohol) and acetone as well as hydrofluoric acid including fluorine together with nitric acid and ammonia water including nitrogen. There is also used ammonium fluoride as a compound of fluorine and nitrogen.

From the point of view of the water pollution control law, it is required to treat the organic matter that increases the fluorine content, nitrogen content and the COD (Chemical Oxygen Demand) to a specified concentration in the case of a waste water that contains nitrogen and organic matter in addition to fluorine. Depending on the location of the plant, a severer additional standard is provided, and accordingly, a severer treatment is sometimes performed in conformity to the above standard and the standard owned by each individual enterprise.

In this case, defluorination is necessary for satisfying the regulation value of the fluorine concentration by the law, the additional standard of administration and the in-house standard of each enterprise. Further, denitrification is also necessary for satisfying the regulation value of the total nitrogen concentration in a waste water, the additional standard of administration and the in-house standard of each enterprise. The removal of the organic matter is necessary for reducing the COD that serves as a regulation value of waste water.

Conventionally, in a semiconductor plant, a mixed waste water having pH 2 to pH 3 containing nitrogen and organic matter in addition to fluorine has been treated as follows.

That is, as shown in FIG. 11, first, fluorine is chemically treated to be neutralized by chemicals such as slaked lime in a coagulo-sedimentation process 32. After the fluorine is neutralized, then nitrogen is treated (nitrified) to nitrate nitrogen while biologically treating the organic matter by aerobic microorganisms in a nitrification tank 33. Subsequently, an organic matter that serves as a hydrogen donor is excessively added from an organic matter tank 26 to a denitrification tank 29 so as to treat the nitrate nitrogen as nitrogen gas dissipating into the atmospheric air. Next, the organic matter excessively added to the denitrification tank 29 is biologically treated in a re-aeration tank 31.

As defluorination equipment for removing fluorine in waste water, there is the one shown in FIG. 12. In this defluorination equipment, a fluorine containing waste water is put through two calcium carbonate containing tanks 101 and 102, and the water flowing from the calcium carbonate containing tank 102 is introduced into a circulation tank 103. Then, the waste water inside the circulation tank 103 is introduced into a membrane filter unit 104, which separates the waste water into a concentrated water including calcium carbonate crystals flowing out of the last calcium carbonate containing tank 102 and a permeated water. Subsequently, the thus-separated concentrated water is sent back to the circulation tank 103. Part of the concentrated water is sent back to the first calcium carbonate containing tank 101. The permeated water is discharged into a reservoir tank 105.

According to the above defluorination equipment, the fluorine in the waste water reacts with the calcium carbonate located inside the calcium carbonate containing tanks 101 and 102 and becomes calcium fluoride. Then, after a lapse of a specified time of treatment, the calcium fluoride is extracted from the calcium carbonate containing tanks 101 and 102. Thus, the fluorine is removed in the form of calcium fluoride.

As another defluorination equipment, there is calcium fluoride collecting equipment as shown in FIG. 13. In this calcium fluoride collecting equipment, calcium carbonate located inside a calcium carbonate silo 107 is added to a fluorine containing solution located inside a calcium carbonate reaction tank 106. Then, through a high-temperature aerating process (high-temperature decompression deaerating process) at a temperature of 50° C. to 100° C., calcium fluoride is collected. It is to be noted that the reference numeral 108 denotes a blower for the aeration and the reference numeral 109 denotes an air diffusion pipe.

The pieces of equipment shown in FIG. 12 and FIG. 13 can also treat fluorine, but they cannot treat the organic matter.

In view of the above, there is waste water treatment equipment for treating a fluorine waste water containing organic matter, as shown in FIG. 14. This waste water treatment equipment removes both fluorine and organic matter in the waste water by skillfully utilizing chemical reaction and biotic reaction with aerobic microorganisms by, for example, making calcium carbonate mineral 124a, which serves as a filler, flow strongly and weakly.

In FIG. 14 are shown a first water tank 111 for executing a principal treatment, a second water tank (sedimentation tank) 112, a third water tank (sludge concentration tank) 113, a polychlorinated aluminum tank 114, clarifiers 115 and 116, blowers 117 through 119, a line mixer 120, a diffuser 121 and air diffusion pipes 122 and 123. There are further shown calcium carbonate mineral pieces 124a through 124c, an inorganic sludge 125 and microorganic sludge 126.

FIG. 15 shows another type of waste water treatment equipment. This waste water treatment equipment is to treat fluorine waste water containing organic matter by using calcium carbonate mineral. This waste water treatment equipment uses all the fillers in a fixed state. Therefore, the calcium fluoride generated as a consequence of the reaction of fluorine in the waste water with calcium remains between the calcium carbonate mineral pieces 146 in the fixed state and exists as a mass for a long time. Then, the mass gradually becomes larger to spread throughout the inside of the whole tank, as a consequence of which the treatment efficiency reduces. In FIG. 15 are shown a first reaction regulation tank 131, a second reaction regulation tank 132, a third water tank 133 that serves as a reaction coagulation tank, a fourth water tank 134 that serves as a sedimentation tank, a fifth water tank 135 that serves as a sludge concentration tank, a filter press 136, water sprinkling tanks 137 and 138, blowers 139 through 141, air diffusion pipes 142 and 143 and clarifiers 144 and 145. There are further shown calcium carbonate mineral 146, a charcoal 147 and plastic filler 148.

The pieces of equipment shown in FIG. 14 and FIG. 15 can treat fluorine and organic matter, but they cannot treat nitrogen.

In view of the above, there can be considered equipment as shown in FIG. 16 besides the equipment shown in FIG. 11 as equipment capable of treating fluorine, organic matter and nitrogen. This waste water treatment equipment is intended for treating fluorine waste water containing nitrogen and organic matter. This equipment treats the organic matter and fluorine in the waste water by means of a second water tank 72. This tank 72 also nitrifies ammoniacal nitrogen and nitrite nitrogen to nitrate nitrogen. Subsequently, denitrification is executed by dissipating nitrogen into the atmospheric air in the form of nitrogen gas with the addition of excessive amount of adding organic matter (methanol or the like) that serves as a hydrogen donor by means of an organic matter tank pump 87 while introducing the waste water into a denitrification tank 89. Subsequently, the organic matter excessively added to the denitrification tank 89 is biologically treated by a re-aeration tank 91.

As prior art treatment equipment for treating nitrogen and fluorine containing waste water, there is the one disclosed in the prior art reference of Japanese Patent Laid-Open Publication No. 8-141597. This treatment equipment for treating the waste water containing nitrogen and fluorine is constructed of (1) a nitrifying unit of a biofilm type, (2) a defluorinating unit comprised of first and second reaction tanks and a sedimentation tank, (3) a biological denitrifying unit, (4) a biological oxidizing unit and (5) a sedimentation tank. In the present equipment, the waste water is first introduced into the denitrifying unit of the biofilm type filled with a microorganism immobilized carrier, and ammoniacal nitrogen is oxidized to nitrite nitrogen and nitrate nitrogen. The waste water is subsequently introduced into the defluorinating unit, and the fluorine in the waste water is removed to such a degree that no influence is exerted on the denitrifying bacteria. Subsequently, the waste water is introduced into the biological denitrifying unit with methanol added to the waste water, and the nitrogen becomes nitrogen gas as a consequence of the progress of the denitrification reaction until the denitrification is completed. Subsequently, the excessive methanol in the waste water is treated by the biological oxidizing unit. Then, the waste water is introduced into the sedimentation tank so as to be separated into supernatant liquid and sludge, and the sludge is sent back to the biological denitrifying unit.

The fluorine waste water discharged from the general semiconductor plant for manufacturing integrated circuits is mixed with chemicals containing nitrogen of nitric acid, ammonia water and ammonium fluoride as well as organic matter such as IPA (isopropyl alcohol) or acetone.

The nitric acid, ammonia water, ammonium fluoride IPA and acetone are sometimes singly discharged. However, through the semiconductor fabricating processes, hydrofluoric acid, nitric acid, ammonia water, ammonium fluoride, IPA, acetone and so on are generally used, and the chemicals are often handled in a clean bench of an identical process. Therefore, a small amount of those chemicals may enter a relatively large amount of hydrofluoric acid waste water.

As a method for treating the "fluorine waste water containing nitrogen and organic matter" that includes the mixture of nitrogen attributed to the nitric acid and ammonia water, the organic matter attributed to the IPA and acetone and fluorine, there is the one as follows.

The most generic method has the steps of firstly (1) chemically treating fluorine by a calcium preparation such as slaked lime and the coagulant of polychlorinated aluminum or the like, subsequently (2) biologically treating the organic matter concurrently with nitrifying the ammoniacal nitrogen and nitrite nitrogen into nitrate nitrogen, subsequently (3) biologically treating (denitrifying) the nitrate nitrogen with addition of methanol that serves as a hydrogen donor and then (4) biologically decomposing the methanol that has been excessively added in the preceding stage.

However, according to this fluorine treatment by the slaked lime, the intended fluorine concentration cannot be achieved unless the excessive amount of slaked lime and coagulant are added in order to reduce the fluorine concentration in the waste water to a single digit. As a result, unreacted slaked lime flows into the sedimentation tank to increase the amount of generation of sludge. This also leads to the problem that the amount of generation of sludge increases due to the excessive addition of the slaked lime, causing a cost increase.

Accordingly, as a method for reducing the amount of generation of sludge in treating the fluorine waste water, there has been developed the methods for removing the fluorine as calcium fluoride by means of calcium carbonate as adopted by the aforementioned pieces of waste water treatment equipment shown in FIG. 12 and FIG. 13. Further, as a further developed method, there has also been developed a method for removing the fluorine and organic matter in the waste water by utilizing chemical reaction and biotic reaction with microorganisms by means of calcium carbonate mineral as adopted by the aforementioned pieces of waste water treatment equipment shown in FIG. 14 and FIG. 15.

However, these methods, which have no aerobic tank where a sufficient anaerobic state exists, have the problem that the nitrogen cannot be treated although the fluorine and organic matter in the waste water can be treated.

As equipment for removing the fluorine, nitrogen and organic matter in the waste water, there is equipment for removing the fluorine waste water containing nitrogen and organic matter as shown in FIG. 16. However, this equipment for removing the fluorine waste water containing nitrogen and organic matter, which removes the organic matter in the waste water by the second water tank 72 that is the aerobic tank, is required to newly excessively add organic matter that serves as a hydrogen donor to the denitrification tank 89. Methanol can be enumerated as a concrete example of the organic matter. The methanol, which is excessively incorporated into the denitrification tank 89, is biologically treated in the subsequent re-aeration tank 91. Judging from the point of view of effective use of the resources, it is resources saving to effectively utilize the organic matter in the waste water as a hydrogen donor, and there is a demand for reasonable resources saving waste water treatment equipment. The nitrogen extraction ratio further improves when a stirrer 90 exists in the denitrification tank 89. However, if the stirring process exists, then the microorganic sludge having a degraded settleability flows from inside the tank, leading to a difficulty in greatly increasing the microorganic concentration. The reason why the microorganic concentration cannot be increased is that the intended microorganic sludge is not sufficiently generated due to the low concentration of organic matter in the fluorine waste water containing nitrogen and organic matter in the general semiconductor plant. In the case of the semiconductor plant waste water, the microorganic sludge is extinguished through aerobic digestion due to aeration even though the microorganic sludge is generated, so that the microorganic concentration cannot be increased. In the equipment shown in FIG. 16, the fluorine, organic matter and nitrogen in the waste water can be treated by installing the denitrification tank 89 and the re-aeration tank 91 in the stages subsequent to the treatment equipment of fluorine and organic matter. However, this method has the problems as follows. That is, the general semiconductor plants have a relatively large amount of fluorine waste water containing nitrogen and organic matter. Therefore, the amount of staying water becomes large assuming that the retention time in the denitrification tank 89 and the re-aeration tank 91 is several hours, and this leads to a vast amount of initial cost for the construction of tanks. Furthermore, a large installation area is necessitated. There is another problem that the organic matter that serves as a hydrogen donor attributed to the IPA and acetone in the waste water cannot be utilized since the organic matter is microorganically treated by the second water tank 72 that serves as an aerobic tank. Therefore, it is required to add an organic matter such as methanol that serves as a hydrogen donor to the denitrification tank 89. Further, the stirrer 90 for increasing the reaction efficiency is provided for the denitrification tank 89, and therefore, the anaerobic microorganic sludge having the degraded settleability cannot be maintained at high concentration. This also leads to the problem that the nitrogen extraction ratio during the denitrification is low.

SUMMARY OF THE INVENTION

Accordingly, an object of the present invention is to provide a waste water treatment method and waste water treatment equipment capable of treating the fluorine waste water containing nitrogen and organic matter at low cost without necessitating the organic matter such as methanol as an additional chemical.

In order to achieve the above object, the present invention provides a waste water treatment method comprising the steps of: filling a water tank with calcium carbonate mineral and anaerobic microorganic sludge; and introducing waste water containing fluorine, nitrogen and organic matter into the water tank for treatment of the waste water.

According to the present invention, The calcium ions dissolving from the calcium carbonate mineral are chemically reacted with the fluorine in the waste water. At the same time, the organic matter in the waste water is treated by utilizing the anaerobic microorganisms in the anaerobic microorganic sludge. The nitrogen (nitrate nitrogen, in particular) in the waste water is reduced by the reducibility owned by the anaerobic microorganisms. That is, according to the present invention, the fluorine, organic matter and nitrogen can be treated in one water tank.

In an embodiment of the present invention, the waste water contains hydrogen peroxide.

According to this embodiment, the fluorine in the waste water is made to chemically react with the calcium ions dissolving from the calcium carbonate mineral, and the nitrogen is treated (denitrified) by utilizing the organic matter in the waste water. Furthermore, hydrogen peroxide in the waste water can be treated by utilizing the reducibility owned by the anaerobic microorganic sludge. That is, the fluorine, organic matter and hydrogen peroxide can be treated in one water tank. Therefore, the number of tanks can be reduced in the waste water treatment equipment, and the initial cost can be reduced.

In an embodiment of the present invention, the organic matter in the waste water is organic matter attributed to isopropyl alcohol or acetone.

According to this embodiment, the organic matter in the waste water is the organic matter attributed to the IPA or acetone. Therefore, the nitrate nitrogen can be easily denitrified in the presence of the denitrifying bacteria with an effect close to that of methanol as a hydrogen donor. As a substance that can serve as a hydrogen donor, methanol is generic and has the best denitrifying effect. As the second best denitrifier, there is the organic matter attributed to IPA or acetone. As an ordinary denitrifier, there can be enumerated generic organic matter of any kind.

The present invention also provides a waste water treatment method comprising the steps of: introducing waste water containing fluorine, nitrogen and organic matter into a raw water tank; introducing the waste water in the raw water tank into an anaerobic tank that has a lower portion containing calcium carbonate mineral and an upper portion in which microorganic sludge is concentrated; introducing the waste water treated in the anaerobic tank into an aerobic tank that contains the calcium carbonate mineral and has a stirring means; and introducing the waste water treated in the aerobic tank into a sedimentation tank for obtaining precipitation of sludge and treated water.

According to the present invention, the fluorine in the waste water can be primarily treated by the calcium carbonate mineral placed in the lower portion of the anaerobic tank, and subsequently, the organic matter in the waste water can be treated by the microorganic sludge concentrated in the upper portion of the anaerobic tank. The unreacted low-concentration fluorine in the anaerobic tank can be secondarily treated by the aerobic tank that has the stirring means and contains the calcium carbonate mineral. This anaerobic tank can treat the ammoniacal nitrogen and the nitrite nitrogen through oxidation. Subsequently, the sedimentation tank can perform solid-liquid separation into treated water and sludge.

In an embodiment of the present invention, the sludge precipitated in the sedimentation tank is sent back to the anaerobic tank so as to be circulated.

According to this embodiment, the microorganic sludge is sent back from the sedimentation tank to the anaerobic tank so as to be circulated, and therefore, the microorganic sludge precipitated in the sedimentation tank can be introduced into the anaerobic tank and concentrated. At the same time, the nitrogen (nitrate nitrogen, in particular) included in the waste water can be introduced into the anaerobic tank, and the denitrification can be executed in the anaerobic tank with the organic matter in the waste water used as a hydrogen donor.

In an embodiment of the present invention, the sludge precipitated in the sedimentation tank contains anaerobic microorganisms that are entrapped by calcium fluoride to be fixed to the calcium fluoride.

According to this embodiment, the precipitated sludge contains the anaerobic microorganisms that are entrapped by the calcium fluoride to be fixed to the calcium fluoride. Therefore, the sludge itself has a biotic treatment function, and concurrently the sludge has a good settleability due to the calcium fluoride. Therefore, the microorganic sludge concentration can be easily increased in the anaerobic tank without floating the sludge, and concurrently the anaerobic state can be easily maintained. That is, the microorganic sludge, which normally has an inferior settleability, changes its properties by being fixed and entrapped in calcium fluoride, consequently becoming a microorganic sludge having a superior settleability. The generic anaerobic microorganisms play the role of treating the organic matter.

In an embodiment of the present invention, the waste water is introduced into the lower portion of the anaerobic tank and the sludge precipitated in the sedimentation tank is introduced into an intermediate portion of the anaerobic tank.

According to this embodiment, the waste water is introduced from the lower portion of the anaerobic tank containing the calcium carbonate mineral. Therefore, the fluorine concentration can be reduced to a concentration at which the fluorine exerts no influence on the microorganisms by chemically transforming the fluorine in the waste water into calcium fluoride. By making the waste water pass through the calcium carbonate mineral layer, the acid waste water can be neutralized to a certain extent. The acid waste water that has been neutralized to a certain extent comes to have a water quality that exerts no influence on the microorganisms.

The sludge precipitated in the sedimentation tank is introduced into the intermediate portion of the anaerobic tank. This precipitated sludge contains the anaerobic microorganisms that have been entrapped and fixed in the calcium fluoride and has a superior settleability, and therefore, the anaerobic state in the anaerobic tank can be easily maintained.

In an embodiment of the present invention, a sludge zone is formed in the upper portion of the anaerobic tank.

According to this embodiment, the sludge zone is formed in the upper portion of the anaerobic tank. This arrangement is able to assure the retention time, keep a large amount of sludge and secure the sludge concentration to a maximum. The anaerobic property is secured and stably maintained in the sludge zone, and therefore, the denitrifying treatment (denitrification) can be made to effectively progress. The anaerobic microorganisms that are entrapped by the calcium fluoride to be fixed in the calcium fluoride have a superior settleability. Therefore, the sludge concentration can be increased and the organic matter in the waste water can be effectively utilized for the treatment.

In an embodiment of the present invention, the upper portion of the anaerobic tank has a suspended solid concentration of 10,000 ppm or more.

According to this embodiment, by virtue of the fact that the sludge is maintained at the concentration of not smaller than 10,000 ppm and the fact that the sludge includes the anaerobic microorganisms, the anaerobic property is maintained securely and stably, so that the reaction can be made to effectively progress. That is, the suspended solid concentration (the concentration of the mixture of the calcium fluoride sludge and the microorganic sludge) in the upper portion of the anaerobic tank is set to the concentration of not smaller than 10,000 ppm. Therefore, the anaerobic state is stabilized and the waste water can be securely treated by the anaerobic microorganisms. Furthermore, even in the case where the pH of the waste water introduced into the upper portion of the anaerobic tank is low and exhibits acidity or in the case where the fluorine concentration in the waste water is relatively high, the buffering function of the sludge is exerted on the waste water when the suspended solid concentration is not smaller than 10,000 ppm, producing the effect for minimizing the influence on the microorganisms that are entrapped and fixed in the sludge. Further, the concentration of the anaerobic microorganisms that are entrapped and fixed in the calcium fluoride is high, and therefore, the organic matter in the waste water can be effectively treated.

In an embodiment of the present invention, the calcium carbonate mineral filled in the anaerobic tank and the aerobic tank is granular.

According to this embodiment, the granular calcium carbonate mineral reacts with the fluorine in the waste water in a short time to produce calcium fluoride, thereby allowing the fluorine in the waste water to be treated. Furthermore, the calcium carbonate mineral, which has a granular form, is easy to be stirred by the water flow of the introduced waste water. The calcium carbonate mineral, which has a granular form, is easily flowed by the water flow of the introduced waste water even in the absence of the aeration process, so that the contact catalytic reaction of the calcium carbonate mineral with the waste water can be made smooth. The granular calcium carbonate mineral can be pneumatically transported and easily put in the tank. The granular calcium carbonate mineral, which is availed in abundance on the market, costs less to allow the running cost of the waste water treatment equipment to be low.

In an embodiment of the present invention, denitrifying bacteria are propagated in the sludge zone.

According to this embodiment, the denitrifying bacteria are propagated in the sludge zone. Therefore, the nitrate nitrogen can be denitrified under the anaerobic condition using the organic matter in the waste water as a hydrogen donor.

In an embodiment of the present invention, the waste water treatment method further comprises the steps of: filtering the treated water from the sedimentation tank; removing calcium ions from the treated water which has been filtered; further removing remaining ions, remaining organic matter and microorganisms from the treated water; and processing the treated water into ultrapure water.

According to this embodiment, in regard to the fluorine waste water containing nitrogen and organic matter of which the fluorine has been treated by using neither the large amount of slaked lime nor the coagulant, the electrical conductivity of its supernatant treated water from which the sludge has been precipitated and separated in the sedimentation tank becomes lower, for example 700 $\mu$s/cm or less. Therefore, by filtering the supernatant treated water, and by removing calcium ions, other remaining ions, organic matter and microorganisms from the filtered water, and there is obtained a treated water having a water quality that can produce a ultrapure water.

In an embodiment of the present invention, the remaining ions, the remaining organic matter and the microorganisms are removed from the treated water with a reverse osmosis membrane which is made of a composite membrane.

According to this embodiment, the reverse osmosis membrane is made of a composite film, and therefore, the membrane surface is not clogged with calcium ions even though the calcium ions attributed to the calcium carbonate mineral are existing in the treated water. Therefore, the permeability of the membrane can be maintained. When the treated water includes calcium ions, the composite film can more stably secure the permeated water than the cellulose acetate film.

In an embodiment of the present invention, an amount of the waste water to be introduced from the raw water tank into the anaerobic tank is controlled according to a dissolved oxygen concentration inside the anaerobic tank.

According to this embodiment, the anaerobic state inside the anaerobic tank can be appropriately maintained by controlling the amount of waste water to be introduced from the raw water tank into the anaerobic tank according to the dissolved oxygen concentration inside the anaerobic tank, so that the denitrifying capability can be maintained.

In an embodiment of the present invention, an amount of aeration air to aerate the aerobic tank is controlled according to a fluorine concentration in the waste water inside the sedimentation tank.

According to this embodiment, by increasing the amount of aeration air when the fluorine concentration in the waste water inside the sedimentation tank is increased, calcium ions easily dissolve from the calcium carbonate mineral in the aerobic tank. By this operation, the dissolved calcium ions react with the fluorine in the waste water to become slightly-soluble calcium fluoride, thereby allowing the treatment of the fluorine in the waste water to be promoted.

In an embodiment of the present invention, organic matter that serves as a hydrogen donor is supplied to the anaerobic tank according to a COD concentration in the waste water inside the raw water tank.

According to this embodiment, the organic matter that becomes the hydrogen donor is reduced when the COD concentration of the waste water is reduced inside the raw water tank. Therefore, by supplying the organic matter that becomes the hydrogen donor into the anaerobic tank, the organic matter concentration in the anaerobic tank is increased to allow the denitrifying reaction to be promoted just as intended.

The present invention further provides waste water treatment equipment comprising a tank including a portion which contains calcium carbonate mineral and into which waste water is introduced and a portion which contains anaerobic microorganic sludge.

According to this embodiment, the calcium ions dissolving from the calcium carbonate mineral located in this water tank is made to chemically react with the fluorine in the waste water. At the same time, the organic matter in the waste water is treated by utilizing the anaerobic microorganisms of the anaerobic microorganic sludge located in the water tank. Furthermore, the nitrogen (nitrate nitrogen, in particular) in the waste water is treated through reduction by the reducibility owned by the anaerobic microorganisms. Therefore, according to this embodiment, the fluorine, organic matter and nitrogen can be treated in one water tank.

In an embodiment of the present invention, the tank is an anaerobic tank a lower portion of which is the portion which contains the calcium carbonate mineral and into which the waste water is introduced and an upper portion of which is the portion which contains the anaerobic microorganic sludge, and further comprising: a raw water tank into which the waste water for the anaerobic tank is introduced; an aerobic tank which has a stirring means and contains the calcium carbonate mineral and into which the waste water from the anaerobic tank is introduced; and a sedimentation tank into which the waste water from the aerobic tank is introduced.

According to this embodiment, the fluorine in the waste water can be primarily treated by the calcium carbonate mineral placed in the lower portion of the anaerobic tank. Subsequently, the organic matter in the waste water can be treated by the concentrated microorganic sludge in the upper portion of the anaerobic tank. The unreacted low-density fluorine in the anaerobic tank can be secondarily treated by the aerobic tank that has the stirring means and contains the calcium carbonate mineral. This aerobic tank can treat the ammoniacal nitrogen and nitrite nitrogen through oxidation. Subsequently, the sedimentation tank can perform solid-liquid separation into treated water and sludge.

In an embodiment of the present invention, the waste water treatment equipment further comprising: a filter unit filtering the treated water from the sedimentation tank; a soft water unit removing calcium ions in the treated water from the filter unit; a reverse osmosis membrane unit removing remaining ions, remaining organic matter and microorganisms in the treated water from the soft water unit; and an ultrapure water producing unit processing the treated water from the reverse osmosis membrane unit into ultrapure water.

According to this embodiment, the filter unit filters the treated water from the sedimentation tank, the soft water unit removes calcium ions in the treated water from the filter unit. The reverse osmosis membrane unit removes remaining ions, remaining organic matter and microorganisms in the treated water from the soft water unit. The ultrapure water producing unit processes the treated water from the reverse osmosis membrane unit, thereby ultrapure water is obtained.

In an embodiment of the present invention, the waste water treatment equipment further comprising: an organic matter tank storing organic matter; a COD concentration meter measuring a COD concentration of the waste water inside the raw water tank; an organic matter tank pump supplying the organic matter to the anaerobic tank according to the COD concentration of the waste water inside the raw water tank.

According to this embodiment, the organic matter stored in the organic matter tank is supplied to the anaerobic tank according to the COD concentration the waste water in the raw water tank which is measured by the COD concentration meter, so that the denitrifying reaction can be regulated just as intended.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A is a timing chart of treatment of the first embodiment in the case where the concentrations of nitrogen, organic matter and fluorine are normal;

FIG. 2B is a timing chart of treatment of the first embodiment in the case where the concentrations of nitrogen, organic matter and fluorine are low;

DETAILED DESCRIPTION OF THE PREFERRED EMBODIMENTS

Figure 1:
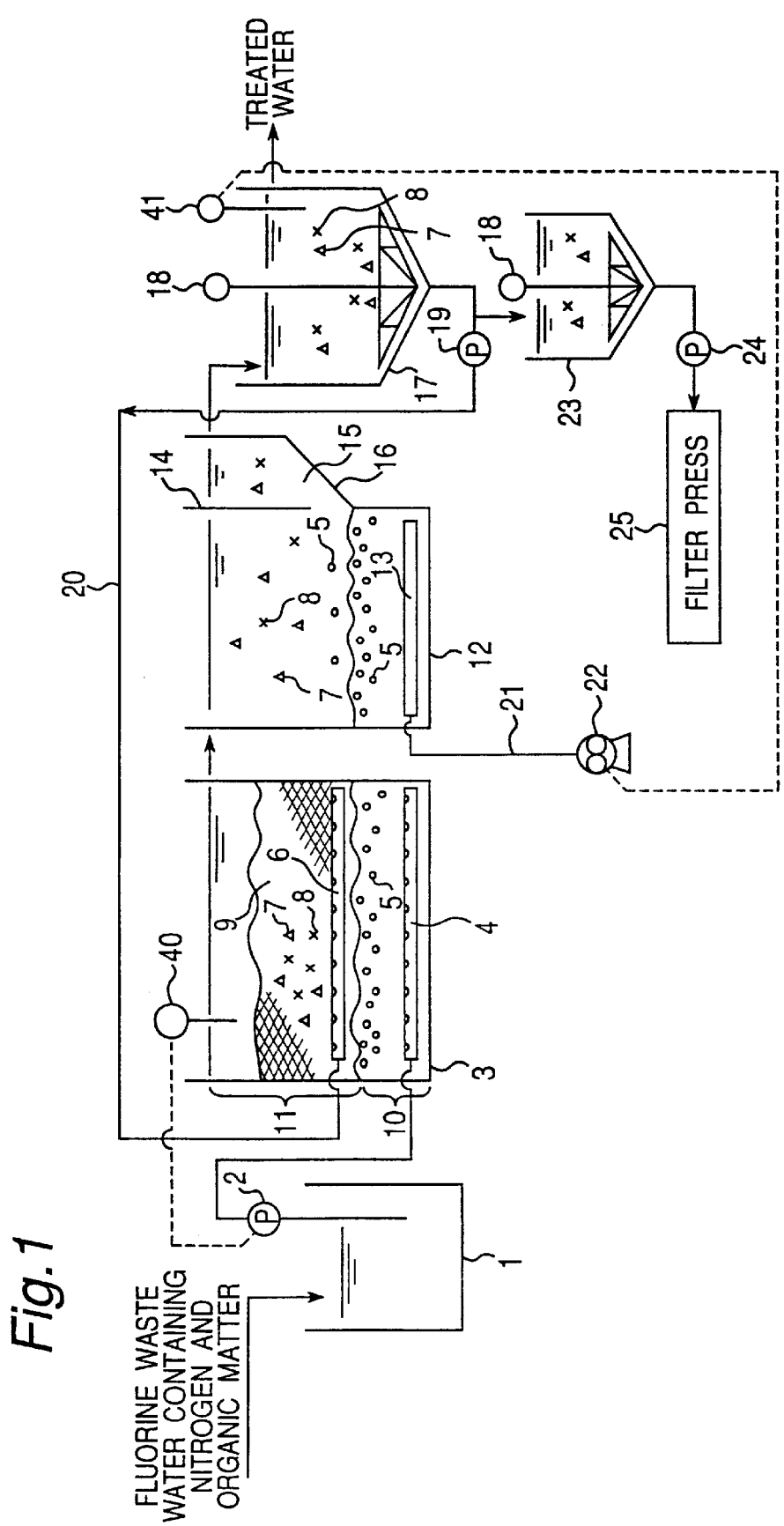
FIG. 1 is a schematic view for explaining a waste water treatment method according to a first embodiment of the present invention.

The present invention will be described in detail below on the basis of the embodiments thereof shown in the drawings.

(First Embodiment)

FIG. 1 shows a construction of waste water treatment equipment for executing a waste water treatment method according to an embodiment of the present invention. This waste water treatment equipment is to treat fluorine waste water containing nitrogen and organic matter.

In this waste water treatment equipment, the fluorine waste water containing nitrogen and organic matter is introduced into a first water tank 1 and reserved there. After a lapse of a specified time, the fluorine waste water containing nitrogen and organic matter, which is introduced has been into a first water tank 1 and reserved there, is introduced from a lower inflow pipe 4 uniformly into the whole tank of a second water tank (anaerobic tank) 3 by a first water tank pump 2. This lower inflow pipe 4 is provided with small openings arranged at regular intervals for uniformly introducing the waste water.

A lower portion 10 of the second water tank 3 contains calcium carbonate mineral 5 having a particle diameter of 0.5 mm. The particle diameter of the calcium carbonate mineral 5 is not limited to 0.5 mm. However, it is sometimes the case where the particles become gradually stationary by water flow and sometimes solidified when the particle diameter is increased, and therefore, the particle diameter should preferably be not greater than 1 mm.

The filling rate of the calcium carbonate mineral 5 to be placed in the second water tank 3 with respect to the tank volume should preferably be 40% at maximum and more preferably be about 30 to 40%. If this filling rate is small, then the calcium carbonate mineral 5 is consumed by the waste water. Accordingly, there is needed a work for frequently replenishing the calcium carbonate mineral 5. Above the layer of the calcium carbonate mineral 5 is arranged an intermediate inflow pipe 6. This intermediate inflow pipe 6 is to return and uniformly introduce the sludge precipitated in a fourth water tank (sedimentation tank) 17 to the bottom surface of an upper portion 11 of the second water tank 3 via a sludge return pipe 20 and a sedimentation tank sludge return pump 19. This intermediate inflow pipe 6 is provided with small openings arranged at regular intervals for uniformly introducing the sludge.

The upper portion of the intermediate inflow pipe 6 serves as a sludge zone 9 comprised of calcium fluoride 7 and microorganic sludge 8. The calcium fluoride 7 is a reactant formed through a chemical reaction of the fluorine in the waste water with the calcium carbonate mineral 5 placed in a second water tank lower portion 10 and a third water tank 12.

In the third water tank 12, the calcium fluoride formed through the reaction of the fluorine in the waste water with the calcium carbonate mineral 5 is once precipitated in a fourth water tank 17 that serves as a sedimentation tank so as to be formed into a calcium fluoride sludge and then introduced into the upper portion 11 of the second water tank 3 by way of the return pipe 20 and the intermediate inflow pipe 6 by the sedimentation tank sludge return pump 19. On the other hand, the anaerobic microorganisms naturally generated in the upper portion 11 of the second water tank 3 and the aerobic microorganisms naturally generated in the third water tank 12 are finally formed into anaerobic microorganisms in the fourth water tank 17 that serves as a sedimentation tank having a retention time of about three hours.

These anaerobic microorganisms are entrapped by and fixed in the mixed calcium fluoride 7 and formed into the microorganic sludge 8. Then, this microorganic sludge 8 is introduced into the upper portion 11 of the second water tank 3 together with the calcium fluoride 7 by way of the intermediate inflow pipe 6 by the sedimentation tank sludge return pump 19.

The fluorine concentration in the waste water is much higher than the organic matter concentration in the waste water. Therefore, comparing the calcium fluoride 7 and the microorganic sludge 8 in the waste water with each other, the calcium fluoride 7 exceeds the microorganic sludge 8 in quantity. Therefore, the microorganisms are entrapped by and fixed in the calcium fluoride 7. The fluorine in the waste water introduced from the lower inflow pipe 4 of the lower portion 10 of the second water tank 3 reacts with the placed calcium carbonate mineral 5 to become the calcium fluoride 7 treating the fluorine, and pH of the waste water comes close to the neutrality. Then, the untreated organic matter in the waste water is biologically treated by anaerobic microorganisms in the sludge zone 9 located in the upper portion 11 of the second water tank 3.

The sludge zone 9, which is in an anaerobic state and formed with the returned sludge from the fourth water tank 17 that serves as the sedimentation tank, is completely in the anaerobic state. In this stage, if the waste water included in the sludge discharged from the intermediate inflow pipe 6 via the sludge return pipe 20 by the sedimentation tank sludge return pump 19 includes nitrate nitrogen, then the nitrate nitrogen is denitrified to becomes nitrogen gas with the organic matter in the waste water used as a hydrogen donor. As described above, the sludge zone 9 serves an anaerobic tank.

In this sludge zone 9, the anaerobic microorganisms propagate at high concentration. However, if the pH of the sludge zone 9 is within a range of pH 3.5 to pH 6, then the anaerobic microorganisms sufficiently propagate unless a sudden change of pH occurs. That is, even though the sludge zone 9 is slightly on the acidity side of the neutrality, the anaerobic microorganisms adapted to the liquidity propagate to treat (denitrify) the nitrogen using the organic matter in the waste water as a hydrogen donor. By confirming whether or not the sludge in the sludge zone 9 has an odor, it can be easily confirmed whether or not the anaerobic microorganisms are propagating in the sludge zone 9. The sludge returned by the return pipe 20 includes a large amount of calcium fluoride 7 having a relatively great specific gravity (having a settleability superior to that of the single microorganic sludge) in addition to the microorganic sludge 8. Therefore, the sludge concentration in the sludge zone 9 becomes a relatively high concentration to allow the anaerobic state to be more favorably maintained. In practice, the suspended solid concentration easily becomes about 30,000 to 40,000 ppm.

Next, the waste water flows from the upper portion 11 of the second water tank 3 into the third water tank (aerobic tank) 12. Thus, the fluorine is primarily treated. The waste water of which the nitrogen and organic matter have been treated is slowly introduced into the third water tank 12. This third water tank 12 contains the calcium carbonate mineral 5 that occupies a volume not greater than about 40% of the tank capacity. Further, in the bottom portion of the third water tank 12, air discharged from a blower 22 is discharged via an air pipe 21 from an air diffusion pipe 13 into the layer comprised of the calcium carbonate mineral 5. The upper portion 12A of the third water tank 12 is opened upward and is provided with a separation chamber 15 partitioned by a partition wall 14. This separation chamber 15 is easy to permit the intrusion of the microorganic sludge 8 and the calcium fluoride 7 and is hard to permit the intrusion of the calcium carbonate mineral 5. This separation chamber 15 has a lower portion that communicates with the third water tank 12 via an inclined wall 16. This separation chamber 15 has the following purposes (1) and (2). (1) The generated calcium fluoride 7 having a small specific gravity and the unreacted calcium carbonate mineral 5 having a great specific gravity are separated from each other taking advantage of the difference in specific gravity. (2) The microorganic sludge 8 having a small specific gravity generated through biotic treatment with the propagated aerobic microorganisms and the calcium carbonate mineral 5 having a great specific gravity are separated from each other.

The separation chamber 15 is connected to the upper portion of the fourth water tank (sedimentation tank) 17 via an outflow pipe (not shown). The fourth water tank 17 is a sedimentation tank, and the treated water serving as a supernatant liquid is separated from the calcium fluoride 7 and the microorganic sludge 8 in this fourth water tank 17, so that the solid-liquid separation is achieved. In this fourth water tank 17 is provided a clarifier 18 for gathering the precipitated sludge toward the center of the bottom portion. Then, the treated water separated from the sludge is taken out as a final treated water of this waste water treatment equipment.

Part of the sludge accumulated in the bottom portion of the fourth water tank 17 is sent through the sludge return pipe 20 back into the entire upper portion 11 of the second water tank 3 from the intermediate inflow pipe 6 located in the upper portion 11 of the second water tank 3 by the sedimentation tank sludge return pump 19. During the return, if there is existing waste water including some nitrate nitrogen besides the sludge, then the nitrate nitrogen in the waste water is treated (denitrified) with the organic matter in the waste water used as a hydrogen donor in the upper portion 11 of the second water tank 3. During this denitrifying treatment, it is a matter of course that the extraction ratio of nitrogen is higher when the anaerobic state is secured and the microorganic concentration is higher.

The sludge that is not returned out of the sludge accumulated in the bottom portion of the fourth water tank 17 is introduced into a fifth water tank 23 that serves as a condensation tank through a sludge pipe (not shown) provided at the bottom. The sludge is gathered toward the bottom portion of the fifth water tank 23 by the clarifier 18 and conveyed with pressure to a filter press 25 that is a sort of dehydrator through a sludge pipe provided at the bottom by a condensation tank pump 24. Then, the sludge is dehydrated by the filter press 25.

As described above, in the waste water treatment equipment of the first embodiment, the fluorine and the calcium in the waste water are made to react with each other using the calcium carbonate mineral 5 as a calcium source in the second water tank 3. According to this reaction, the fluorine in the waste water is primarily treated, however, the treatment is not complete. Therefore, the liquidity is of neutrality and acidity. Under this condition, the fluorine is remaining in the waste water. Then, the waste water containing the calcium fluoride 7 generated through the above reaction is stirred by the return sludge including the anaerobic microorganisms in the presence of the organic matter. By this stirring, the anaerobic microorganisms are propagated, and the treatment of the nitrogen is executed with the organic matter in the waste water used as a hydrogen donor, i.e., by dissipating nitrogen gas into the atmospheric air.

Next, the waste water containing some fluorine is treated by the calcium carbonate mineral 5 placed in the third water tank 12. In this stage, the fluorine in the waste water reacts with calcium and concentrated by the propagated aerobic microorganisms. In either case, the fluorine in the wastewater is treated. The third water tank 12 is aerated, and therefore, the ammoniacal nitrogen and nitrite nitrogen are oxidized by air to nitrate nitrogen. Then, the sludge is precipitated and separated in the fourth water tank 17, and the supernatant liquid is discharged as treated water.

The waste water treatment equipment having the above construction operates as follows according to the treatment timing chart as shown in FIG. 2A in the case where the concentrations of the nitrogen, organic matter and fluorine in the waste water are normal or according to the treatment timing chart as shown in FIG. 2B in the case where the concentrations of the nitrogen, organic matter and fluorine in the waste water are low.

First, the first water tank pump 2 is driven to flow the fluorine waste water containing nitrogen and organic matter from the lower inflow pipe 4 into the lower portion 10 of the second water tank 3 so that the waste water is uniformly distributed in the horizontal direction and make the waste water react with the calcium carbonate mineral 5 to form the calcium fluoride 7. The calcium carbonate mineral 5 has a diameter of about 0.5 mm and is abundantly provided. Then, the surface of the calcium carbonate mineral 5 is dissolved by the acid waste water eluting calcium ions, and the eluted calcium ions and the fluorine in the waste water are made to chemically react with each other to generate the calcium fluoride 7 (primary treatment of fluorine).

The calcium carbonate mineral 5 placed in the second water tank lower portion 10 slightly flows when the waste water is uniformly discharged from the lower inflow pipe 4. It is sometimes the case where a microorganisms are generated on the surface of the calcium carbonate mineral 5. In this case, the microorganisms are anaerobic microorganisms that utilize the organic matter in the waste water. On the other hand, the return sludge from the fourth water tank (sedimentation tank) 17 is introduced into the second water tank upper portion 11 and deposited at high concentration, forming the sludge zone 9. The second water tank 3 is provided with no equipment for strongly stirring the calcium carbonate mineral 5. In addition, the specific gravity of the calcium carbonate mineral 5 is 2.7 and the specific gravity of the return sludge is much lower than 2.7 and close to one. Therefore, the calcium carbonate mineral layer and the return sludge layer are not mixed with each other. As described above, the waste water reacts with the calcium carbonate mineral 5, and the generated calcium fluoride 7 is moved to the sludge zone 9 by the stream of the waste water, forming a new sludge zone. The anaerobic microorganisms propagating in this sludge zone 9 treat the organic matter in the waste water. The denitrifying bacteria, or the anaerobic microorganisms propagating in the sludge zone 9 can generate nitrogen gas or perform denitrification due to the existence of the organic matter and the nitrate nitrogen in the waste water. The denitrifying bacteria can effectively perform the denitrification by utilizing the organic matter in the waste water if the anaerobic state is secured and the microorganic concentration of the denitrifying bacteria is high. Then, the denitrification can be more effectively achieved if the suspended solid concentration in the sludge zone 9 is not smaller than 10,000 ppm and the return sludge is introduced with an amount of water four or more times the amount of waste water flowing into the sludge zone 9.

In this case, the filling rate of the calcium carbonate mineral 5 in the second water tank 3, which also differs depending on the fluorine concentration in the waste water, is intended to be not greater than about 40% of the total volume of the second water tank 3. Then, the calcium carbonate mineral 5 is set so as to be maintained for one month or a longer time from the introduction of the waste water. With this setting, the frequency of replenishment of the calcium carbonate mineral 5 can be reduced to allow the maintenance cost to be reduced. It is to be noted that the large amount of calcium carbonate mineral 5 is placed so as to be able to be maintained for one month or a longer time as described above in the present embodiment. Therefore, if the degree of acidity of the waste water changes, then the change can be sufficiently absorbed.

The calcium fluoride 7 is a substance that naturally exists as a fluorite. Therefore, the microorganisms tend to propagate on the calcium fluoride 7. Furthermore, the calcium fluoride 7, which is formed into a floc shape, has the property of entrapping (entrapping and fixing) the microorganisms therein. Therefore, the microorganisms can propagate even though some fluorine exists in the waste water. It is to be noted that the calcium fluoride 7 that entraps and fixes the microorganisms therein has permeability with respect to the organic matter. Therefore, the organic matter is effectively treated by the anaerobic microorganisms entrapped and fixed in the calcium fluoride.

Next, the ascension rate of the waste water toward the upper portion 11 of the second water tank 3 from the lower portion 10 of the second water tank 3 is determined by the amount of the calcium carbonate mineral 5 placed in the second water tank 3 and the water quality of the fluorine waste water containing nitrogen and organic matter. In practice, it is proper to set 1 m per hour as a standard. This ascension rate is of the same degree as the ascension rate in the activated carbon adsorption tower for normal water treatment. In the present embodiment, the particle diameter of the calcium carbonate mineral 5 placed in the second water tank 3 is made to be not greater than 0.3 mm. Therefore, the surface area can be increased to allow the reaction with fluorine to be improved, and the calcium carbonate mineral 5 is easily flowed by the water flow discharged from the first water tank pump 2 to allow the reaction to be promoted. The particle diameter of the calcium carbonate mineral 5 placed in the third water tank 12 is made to be not greater than 0.5 mm. By making the calcium carbonate mineral 5 have a particle diameter of not greater than 0.5 mm, a balance relation with the aeration by the air diffusion pipe 13 in the third water tank 12 is easy to be maintained. Therefore, a state in which the calcium carbonate mineral 5 flows is formed throughout a wide region inside the third water tank 12. In this case, the balance relation is defined as a state in which the calcium carbonate mineral 5 does not rapidly sink and the flowing state is consistently maintained by the aeration.

Depending on a fluorine inflow concentration and a nitrogen inflow concentration of the waste water, the amount of the calcium carbonate mineral 5 to be placed in the lower portion 10 of the second water tank 3 and the third water tank 12 and the amount of sludge to be reserved in the upper portion 11 of the second water tank 3 are determined. The concentration of the calcium carbonate mineral 5 is determined by the amount of the calcium carbonate mineral 5 to be placed. The retention time of the waste water should be determined by the fluorine inflow concentration or the nitrogen inflow concentration. In the present embodiment, the retention time in the second water tank lower portion 10 was set to two hours or a longer time, the retention time in the second water tank upper portion 11 was set to two hours or a longer time and the retention time in the third water tank 12 was set to two hours, including the safety factor, in the case where the fluorine concentration was about 30 ppm to 300 ppm.

That is, the retention time in the third water tank 12 excluding the separation chamber 15 is set to two hours, and the retention time in the second water tank 3 and the third water tank 12 is set to six hours or a longer time in total. As described above, by forming the calcium carbonate mineral 5 having a diameter of not greater than 0.3 mm or 0.5 mm and the sludge zone 9 and setting the retention time in the second water tank 3 and the third water tank 12 to six hours or a longer time, the nitrogen can be infallibly treated by utilizing the fluorine and organic matter in the waste water.

Since the calcium carbonate mineral 5 is generally availed on the market, it is least expensive to adopt the product on the market, and the unit price increases as the particle diameter increases. Therefore, taking the reaction efficiency and cost into consideration, the particle diameter of the calcium carbonate mineral 5 should preferably be made not greater than 2 mm. Also depending on the water quality, the time of reaction in the lower portion 10 of the second water tank 3 and the third water tank 12 is required to be eight hours or a longer time when the particle diameter is made greater than 2 mm. Consequently, the capacity of the water tank increases to disadvantageously increase the initial cost of the tank.

The third water tank 12 is consistently maintained in an aerobic state attained by the air that is blown from the blower 22 and discharged from the air diffusion pipe 13. Then, by the aeration inside the third water tank 12, the ammoniacal nitrogen and the nitrite nitrogen in the waste water are oxidized by the oxygen in the atmospheric air and denitrified to the nitrate nitrogen. Then, the inside of the third water tank 12 is aerated by the air discharged from the air diffusion pipe 13, and therefore, the calcium carbonate mineral 5 is consistently in the flowing state. Inside this third water tank 12, the unreacted fluorine in the waste water reacts with the calcium of the calcium carbonate mineral 5 to form the calcium fluoride 7, thereby treating the fluorine in the waste water. This is the secondary treatment of fluorine. It is to be noted that the aforementioned reaction in the lower portion 10 of the second water tank 3 is the primary treatment of fluorine.

Inside the third water tank 12, the aerobic microorganisms propagate using the small amount of organic matter remaining in the waste water as a nutrient. That is, the organic matter in the waste water is treated. Inside the third water tank 12, the three substances of (1) the calcium carbonate mineral 5, (2) the calcium fluoride 7 and (3) the microorganic sludge 8 are in the flowing state. Then, an inorganic sludge comprised of the calcium fluoride 7 that enters the non-aeration separation chamber 15 under the partition wall 14 and the microorganic sludge 8, which have a specific gravity close to one, separate from the calcium carbonate mineral 5, flow out of the separation chamber 15 and enter the fourth water tank 17. The fourth water tank 17 is a sedimentation tank. The minute calcium fluoride 7 and microorganic sludge 8 in the waste water flow into the fourth water tank 17 and are separated into a supernatant liquid and a precipitant in the state having aeration process. In this fourth water tank 17 having no aeration process, the aerobic microorganisms that serve as a precipitant is insulated from oxygen and rapidly consumes the oxygen dissolved in the waste water, thereby putting the fourth water tank 17 into the anaerobic state. Then, as time elapses, the bottom portion of the fourth water tank 17 comes to have a mixture of the calcium fluoride 7 and the microorganic sludge 8. Then, the calcium fluoride 7, which has an adhesive property in a floc shape, entraps (entraps and fixes) the microorganisms therein. The calcium fluoride 7 is an inorganic sludge where the microorganic sludge 8 also exists, and therefore, a mixed sludge exists inside the fourth water tank 17. Then, the anaerobic microorganisms propagate as time elapses presumably for the following reasons (1) through (4).

(1) A small amount of organic matter exists in the waste water.

(2) Calcium fluoride that is a natural substance exists in the sludge.

(3) The aerobic microorganisms propagate in the third water tank 12, and the aerobic microorganisms flow into the fourth water tank 17 to consume oxygen. Consequently, a promoted anaerobic state results to extinguish the aerobic microorganisms, and the anaerobic microorganisms propagate by eating the dead microorganic bodies.

(4) The non-aeration tank has a sufficient volume.

Then, the anaerobic microorganisms, which generally have reducibility with respect to the waste water, has a denitrifying function. Conventionally, denitrification has been performed by the anaerobic microorganisms. If the anaerobic microorganisms exist at high concentration and the hydrogen peroxide that serves as an oxidant exists in the waste water, then the hydrogen peroxide is, of course, treated by the reducibility of the anaerobic microorganisms.

The precipitating time in the fourth water tank 17 is set to three hours or a longer time. In this fourth water tank 17, the calcium fluoride 7 that serve as an inorganic sludge and the microorganic sludge 8 precipitated in the conically tapered bottom portion are gathered by the clarifier 18, by which the inorganic sludge, the microorganic sludge 8 and the supernatant liquid are separated from one another. This supernatant liquid is sent out as treated water. The retention time (precipitating time) in the fourth water tank 17 is sufficiently longer than the retention time (within 0.5 hour) of the separation chamber 15 of the third water tank 12. Therefore, the calcium fluoride 7 and the microorganic sludge 8 that have not been precipitated and hence not separated in the separation chamber 15 precipitate.

The precipitated mixed sludge is mostly sent back to the sludge zone 9 by the sedimentation tank sludge return pump 19 and the return pipe 20 until the suspended solid concentration of the sludge zone 9 becomes equal to or higher than 10,000 ppm. This mixed sludge is a mixed sludge of calcium fluoride 7 that serves as an inorganic sludge and the microorganic sludge 8.

Despite the fact that an upward water stream is generated by the discharge of the waste water from the lower inflow pipe 4 in the lower portion 10 of the second water tank 3, this mixed sludge is concentrated in the second water tank upper portion 11 due to the fact that the mixed sludge is heavier than the single body of the microorganic sludge and the second water tank 3 is not aerated. Then, in the presence of the upward water stream, the mixed sludge slightly flows, thereby promoting the biotic reaction of the anaerobic microorganisms with the waste water. If the rate of return to the sludge zone 9 by the sedimentation tank sludge return pump 19 is largely increased, then an abrupt upward water stream is generated in the upper portion 11 of the second water tank 3, and the sludge in the sludge zone 9 flows into the third water tank 12. As described above, even in the case where the sludge is reserved by a specified amount in the sludge zone 9, the sedimentation tank sludge return pump 19 continues to operate. The reason for the above is that the return sludge also contains the waste water and the nitrate nitrogen in the waste water is to be treated. That is, initially, the ammoniacal nitrogen and the nitrite nitrogen in the waste water are oxidized to the nitrate nitrogen in the third water tank 12 and subsequently flowed into the fourth water tank 17 in the form of the nitrate nitrogen. Then, by sending the waste water back to the sludge zone 9 together with the return sludge, the nitrate nitrogen in the waste water is treated to be denitrified in the anaerobic state.

On the other hand, the mixed sludge comprised of the inorganic sludge and the microorganic sludge 8, which becomes unnecessary, is introduced into the fifth water tank 23. This fifth water tank 23 is a condensation tank, where the sludge to be treated is reserved for five hours or a longer time. Then, the sludge to be treated is conveyed with pressure to the filter press 25 by the condensation tank pump 24 and then dehydrated. The filter press 25 is a dehydrator having a relatively good dehydration property, and a dehydrated cake having a moisture content of not greater than 60% is obtained by this filter press 25. In regard to the amount of sludge obtained by the filter press 25, the amount of sludge can be remarkably reduced as compared with the prior art waste water treatment method that uses a large amount of slaked lime and coagulant while not using the calcium carbonate mineral 5 at all.

In contrast to the fact that the sludge inside the third water tank 12 has a color of white and gray, the sludge introduced from the fourth water tank 17 into the fifth water tank 23 exhibits a blackish gray due to the propagation of sulfate-reducing bacteria based on the sulfate ions in the waste water and gives off an odor characteristic of the anaerobic microorganisms. Therefore, it can be decided whether or not the anaerobic denitrifying bacteria (reducing bacteria) are propagating in the sludge by the color and odor of the sludge. It is to be noted that the odor of this sludge is not such an odor that causes an environmental pollution.

The second water tank upper portion 11 is mounted with an oxidation reduction electrometer 40. Then, on the basis of a signal from this oxidation reduction electrometer 40, the number of revolutions of the motor of the first water tank pump 2 is inverter controlled, for the control of the amount of waste water introduced into the lower portion 10 of the second water tank 3. Therefore, if the anaerobic state of the second water tank upper portion 11 cannot be maintained by the waste water including about 2 ppm of dissolved oxygen, then the number of revolutions of the motor of the first water tank pump 2 is inverter controlled on the basis of a detection value of the oxidation reduction electrometer 40 so as to automatically reduce the amount of waste water to be introduced. By this operation, the anaerobic state of the second water tank upper portion 11 is appropriately maintained to keep the denitrifying capability. In practice, the case where the anaerobic state cannot be maintained is the case where oxidation reduction potential in the second water tank upper portion 11 exceeds the range of −200 mV to −300 mV and becomes −100 mV or −50 mV.

The fourth water tank 17 is mounted with a fluorine concentration meter 41. Then, on the basis of a signal from this fluorine concentration meter 41, the number of revolutions of the motor of the blower 22 is inverter controlled to adjust the amount of aeration air. If the fluorine concentration of the fourth water tank 17 becomes higher than 15 ppm, then the number of revolutions of the motor of the blower 22 is inverter controlled by the signal of the fluorine concentration meter 41 so as to promote the reaction of the waste water with the calcium carbonate mineral 5 by increasing the amount of aeration air in the third water tank 12. By this operation, the chemical reaction of the fluorine with the calcium in the waste water is promoted to reduce the fluorine concentration in the waste water. Then, although the blower 22 executes inverter control, the necessary minimum amount of aeration air for oxidizing the ammoniacal nitrogen and nitrite nitrogen in the waste water into nitrate nitrogen is secured.

As described above, according to the waste water treatment equipment of the present embodiment, the frequency of replenishment of the calcium carbonate mineral 5 for use in treating the fluorine in the second water tank 3 and the third water tank 12 is less, and the calcium carbonate mineral 5 is less expensive than the slaked lime used for the conventional fluorine treatment. In treating the nitrogen, the organic matter in the waste water is utilized as a hydrogen donor, and the denitrification is executed with the anaerobic state maintained by the high-concentration sludge. Therefore, the denitrification efficiency is good, so that the running cost can be lowered as compared with the prior art system in which the slaked lime or methanol is added as a hydrogen donor. In the present embodiment, if the amount of air discharged from the air diffusion pipe 13 of the third water tank 12 is set to 100 $m^3$ a day per water tank volume of 1 $m^3$, then the normal fluorine concentration as well as the treatment of ammoniacal nitrogen and nitrite nitrogen into nitrate nitrogen can be achieved.

Therefore, if the rate of air discharge from the air diffusion pipe 13 is set to 150 $m^3$ or greater, then the reaction of the calcium carbonate mineral 5 with the fluorine in the waste water and the oxidation of the nitrogen compounds (ammoniacal nitrogen and nitrite nitrogen) are promoted, so that the extraction ratio of fluorine and the oxidation rate of the nitrogen compounds are improved.

In the first embodiment, the calcium carbonate mineral is placed in the lower portion of the anaerobic water tank and the upper portion of thereof is occupied by the anaerobic microorganic sludge. However, the calcium carbonate mineral may be placed in the upper portion of the anaerobic water tank and the anaerobic microorganic sludge may be placed in the upper portion thereof, for example by using a separation net between the upper and lower portions.

(Second Embodiment)

Figure 3:
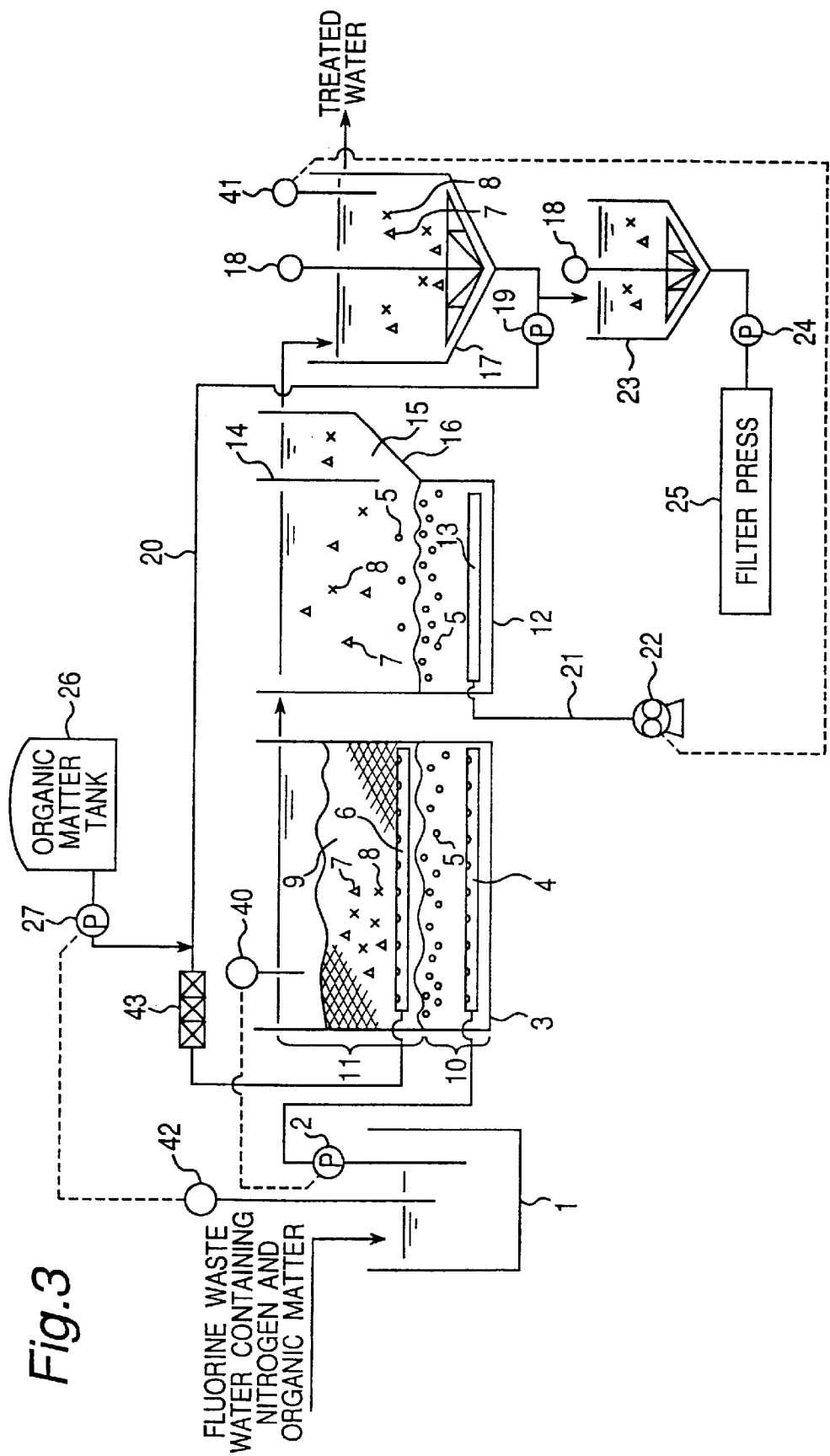
FIG. 3 is a schematic view for explaining a waste water treatment method according to a second embodiment of the present invention.

Next, FIG. 3 shows the construction of waste water treatment equipment for executing the waste water treatment method of the present invention. This waste water treatment equipment is obtained by incorporating an organic matter tank 26, an organic matter tank pump 27, a COD (Chemical Oxygen Demand) concentration meter 42 and a line mixer 43 into the waste water treatment equipment of the first embodiment shown in FIG. 1. This second embodiment differs from the waste water treatment equipment shown in FIG. 1 only in that the above units are incorporated. Therefore, only the point different from the construction shown in FIG. 1 will be described in detail.

Specifically, as an organic matter to be reserved in the organic matter tank 26, there can be selected methanol or IPA (isopropyl alcohol) or acetone generated as a waste from the semiconductor plant. These materials should be selected for the convenience of each plant. The organic matter that serves as a hydrogen donor is correlated with the COD value. The organic matter reserved in the organic matter tank 26 is poured partway into the sludge return pipe 20 by the organic matter tank pump 27 and mixed with the return sludge by the line mixer 43. The organic matter tank pump 27 is operated when the amount of organic matter in the waste water is small and the extraction ratio of nitrogen is reduced.

That is, when the detection value obtained by the COD concentration meter 42 provided for the first water tank 1 indicates a concentration of not greater than 8 ppm, the COD concentration meter 42 issues a signal to operate the organic matter tank pump 27 and pour the organic matter into the return sludge. Then, the organic matter and the return sludge are mixed with each other in the pipe by the line mixer 43 so as to adjust the conditions for promoting the denitrifying reaction in the upper portion 11 of the second water tank 3. When the COD concentration meter 42 provided for the first water tank 1 indicates a concentration of not smaller than 25 ppm, the operation of the organic matter tank pump 27 is stopped by the signal from the COD concentration meter 42. As described above, even when the organic matter content in the waste water is small, the organic matter is automatically added to the second water tank upper portion 11 by controlling the organic matter tank pump 27 to be turned on and off, so that the denitrifying reaction can be made to progress just as intended.

(Third Embodiment)

Figure 4:
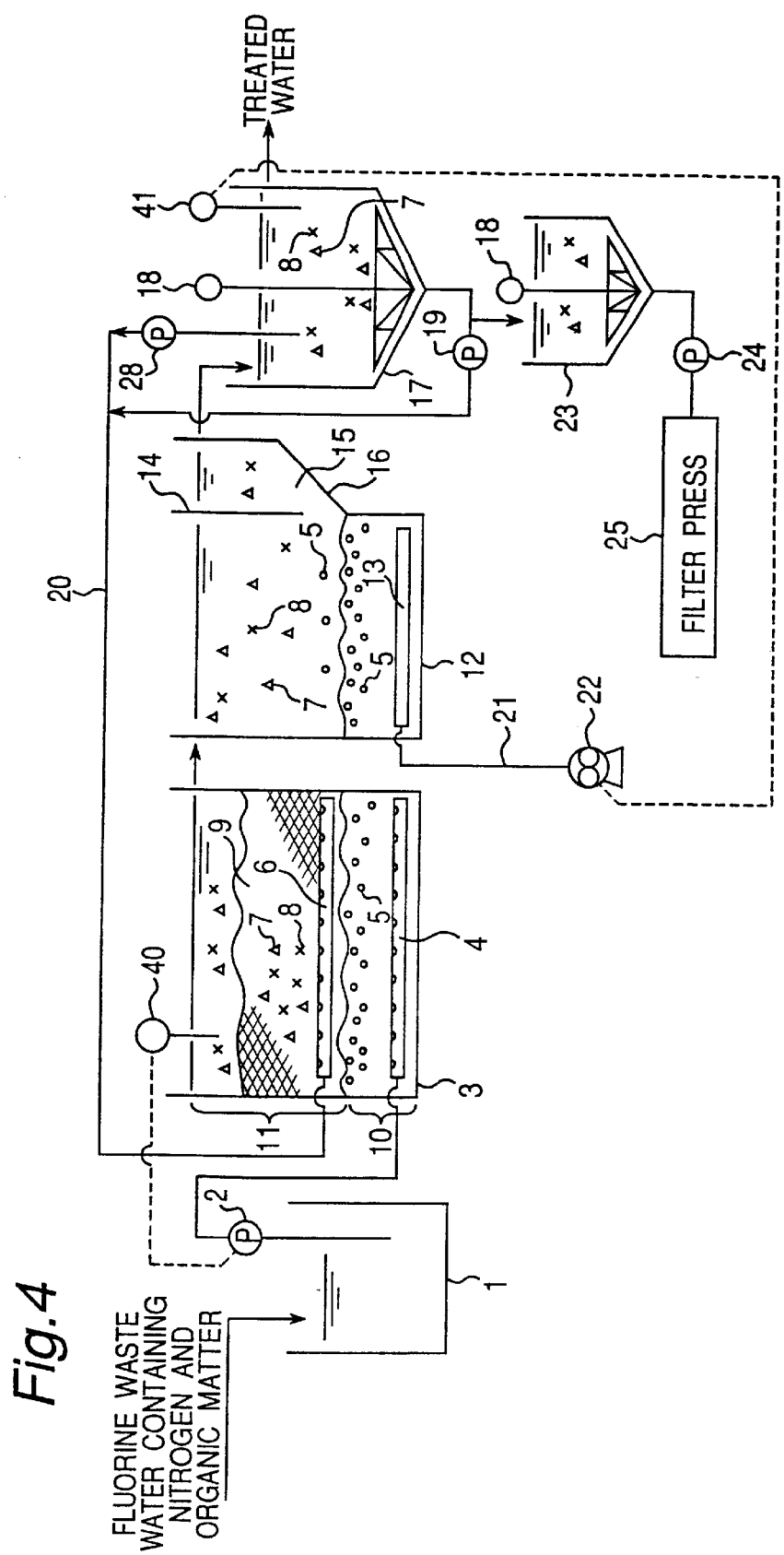
FIG. 4 is a schematic view for explaining a waste water treatment method according to a third embodiment of the present invention.

Next, FIG. 4 shows the construction of the waste water treatment equipment of the third embodiment for executing the waste water treatment method of the present invention. This waste water treatment equipment is obtained by incorporating a circulation pump 28 into the upper portion of the fourth water tank 17 in the waste water treatment equipment of the first embodiment shown in FIG. 1. This third embodiment differs from the first embodiment shown in FIG. 1 only in the above point. Therefore, only the point different from FIG. 1 will be described in detail.

The denitrifying reaction in the upper portion 11 of the second water tank 3 will ideally progress when the following conditions are satisfied.

(1) The reaction tank (upper portion 11) is securely in the anaerobic state.

(2) A large amount of anaerobic microorganisms exist.

(3) An appropriate amount of organic matter that serves as a hydrogen donor exists in the waste water.

(4) An amount of circulating water four to six times the amount of inflow water exists.

The fact that the amount of circulating water is required to be four to six times the amount of inflow water during the denitrifying reaction is the experiential factor of denitrification. The construction of the first embodiment shown in FIG. 1 satisfies the aforementioned factors (1), (2) and (3) but it does not satisfy the factor (4).

Therefore, according to this third embodiment, as shown in FIG. 4, the circulation pump 28 is provided above the fourth water tank (sedimentation tank) 17 so as to securely send a specified amount of waste water containing nitrate nitrogen back into the upper portion 11 of the second water tank 3. With this arrangement, the amount of circulating water four to six times the amount of inflow water can be secured even when the sedimentation tank sludge return pump 19 has a small capacity, so that the amount of circulating water can be infallibly secured to allow the denitrifying reaction to efficiently progress. Furthermore, according to this third embodiment, the amount of circulating water can be infallibly secured and measured. Further, the amount of circulating water can be infallibly secured even in the case where the amount of discharge of the sedimentation tank sludge return pump 19 is changed by the mass of sludge, so that the denitrifying reaction can efficiently progress.

(Fourth Embodiment)

Figure 5:
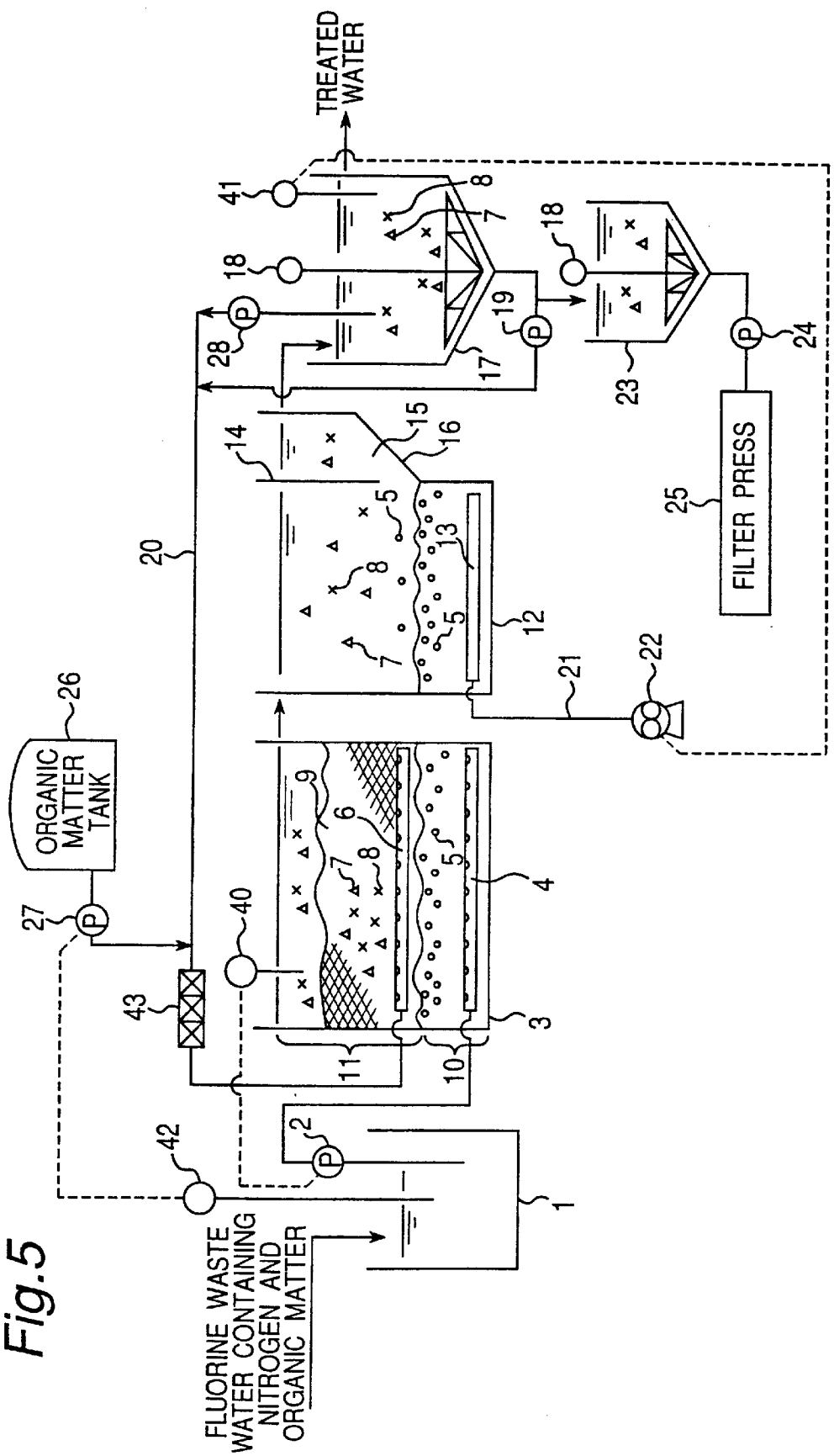
FIG. 5 is a schematic view for explaining a waste water treatment method according to a fourth embodiment of the present invention.

Next, FIG. 5 shows the construction of the waste water treatment equipment of the fourth embodiment for executing the waste water treatment method of the present invention. This waste water treatment equipment is obtained by incorporating a circulation pump 28 into the upper portion of the fourth water tank 17 in the waste water treatment equipment of the second embodiment shown in FIG. 3. This fourth embodiment differs from the waste water treatment equipment shown in FIG. 3 only in the point that the above unit is incorporated. Therefore, only the point different from FIG. 3 will be described in detail.

The denitrifying reaction in the upper portion 11 of the second water tank 3 will ideally progress when the following conditions are satisfied as described in connection with the aforementioned third embodiment.

(1) The reaction tank is securely in the anaerobic state.

(2) A large amount of anaerobic microorganisms exist.

(3) An appropriate amount of organic matter that serves as a hydrogen donor exists in the waste water.

(4) An amount of circulating water four to six times the amount of inflow water exists.

According to this fourth embodiment, as shown in FIG. 5, the circulation pump 28 is provided above the fourth water tank 17 that serves as a sedimentation tank. With this arrangement, a specified amount of waste water including nitrate nitrogen can be securely sent from the fourth water tank 17 back into the upper portion 11 of the second water tank 3. Therefore, the above conditions (1) through (4) can be satisfied, so that the denitrification can be securely executed.

(Fifth Embodiment)

Figure 6:
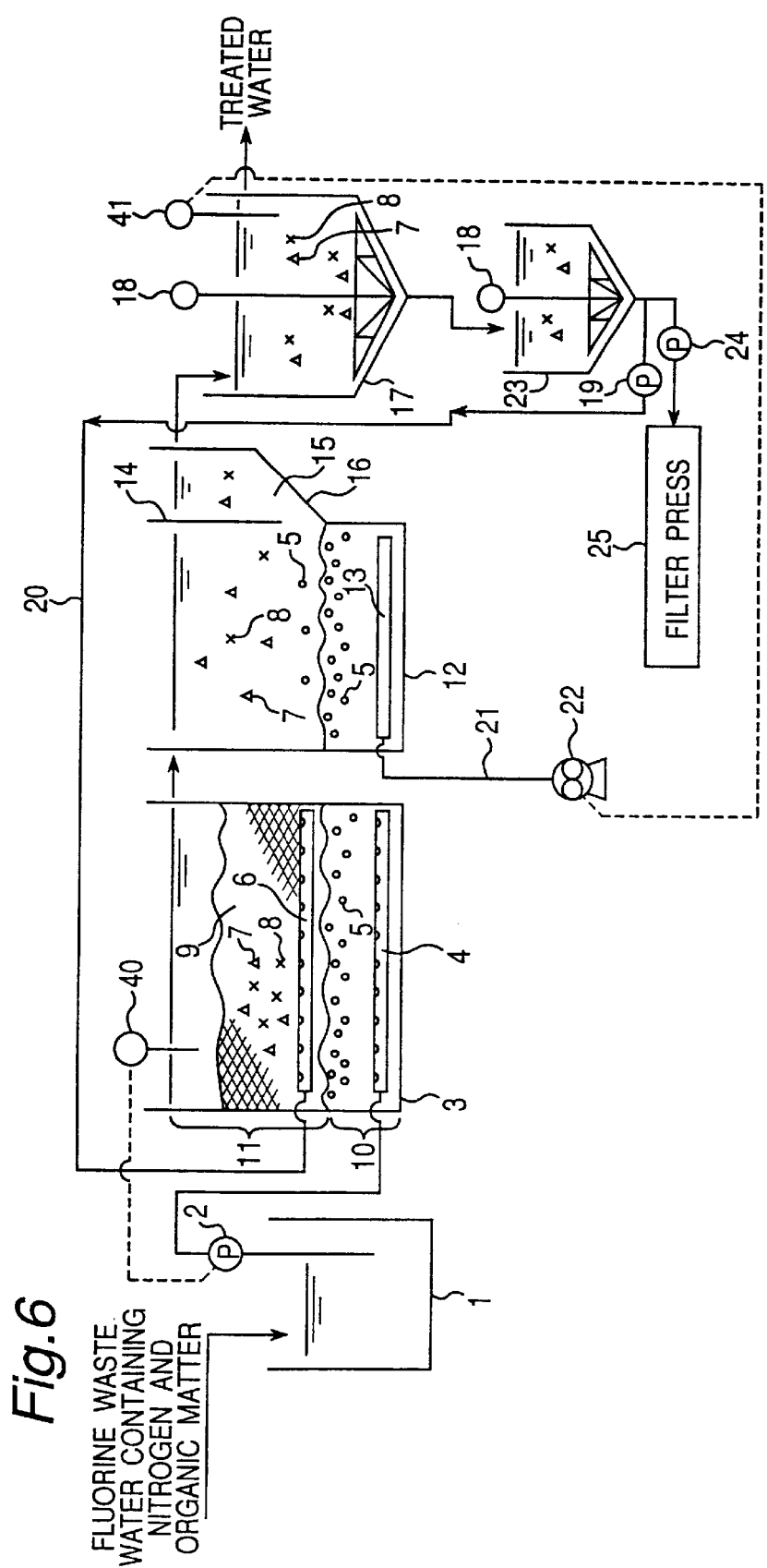
FIG. 6 is a schematic view for explaining a waste water treatment method according to a fifth embodiment of the present invention.

Next, FIG. 6 shows the construction of waste water treatment equipment of the fifth embodiment for executing the waste water treatment method of the present invention. The present waste water treatment equipment differs from the waste water treatment equipment of the first embodiment shown in FIG. 1 only in that the present equipment sends the sludge back into the second water tank upper portion 11 not from the fourth water tank 17 but from the condensation tank 23, thereby improving the anaerobic microorganism concentration.

In this fifth embodiment, the sludge is reserved in both the fourth water tank 17 that serves as an anaerobic tank and the condensation tank 23 and sent back into the second water tank upper portion 11 in the further concentrated state. Therefore, this return sludge has a longer retention time than that of the first embodiment, and the anaerobic state is improved with the anaerobic microorganisms sufficiently propagated. Therefore, the denitrifying reaction can progress more effectively than the first embodiment if an appropriate amount of organic matter exists in the waste water in the upper portion 11 of the second water tank 3.

(Sixth Embodiment)

Figure 7:
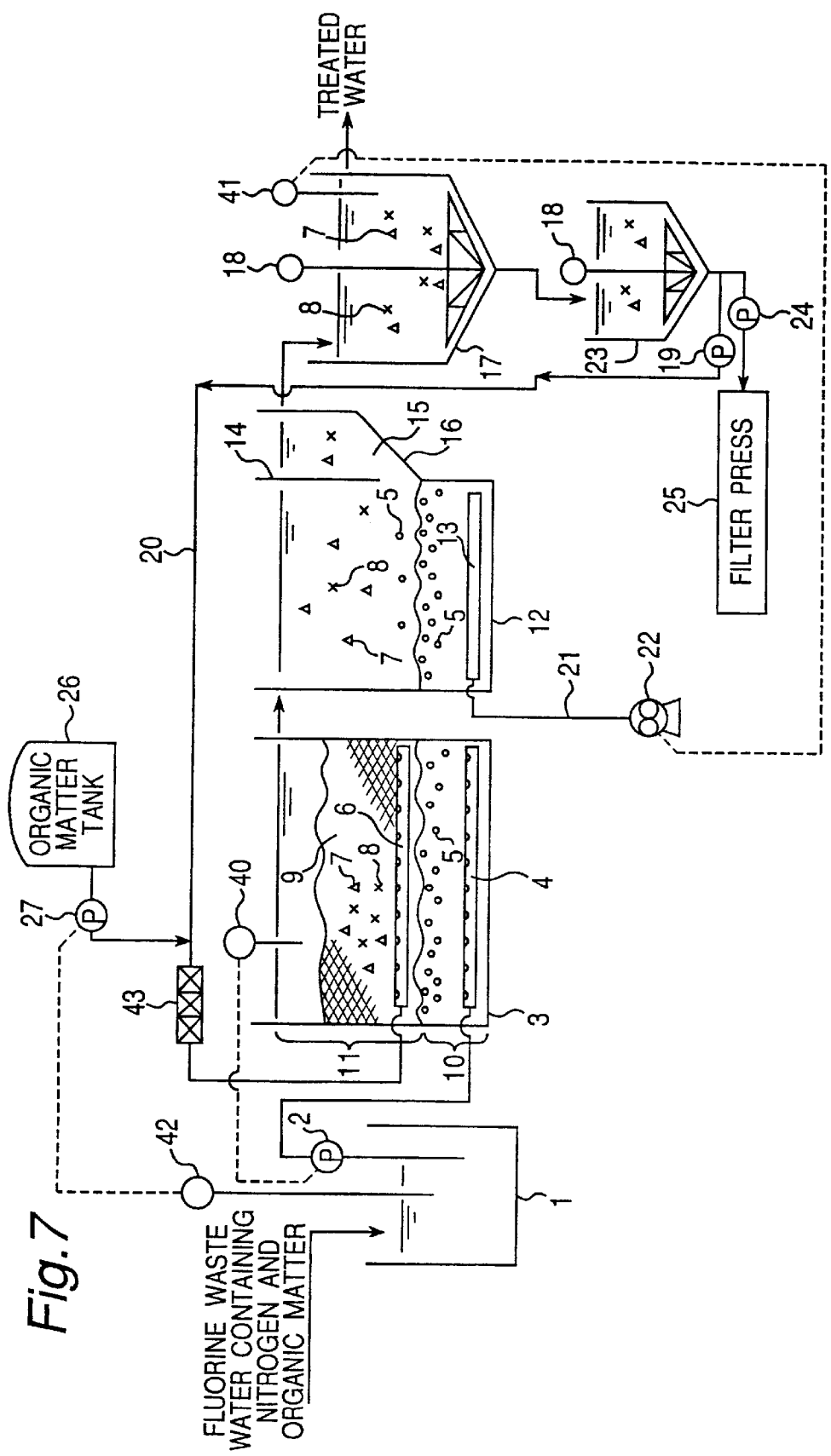
FIG. 7 is a schematic view for explaining a waste water treatment method according to a sixth embodiment of the present invention.

Next, FIG. 7 shows the construction of waste water treatment equipment of the sixth embodiment for executing the waste water treatment method of the present invention. This waste water treatment equipment differs from the waste water treatment equipment of the second embodiment shown in FIG. 3 only in that the present equipment sends the sludge back into the second water tank upper portion 11 not from the fourth water tank 17 but from the condensation tank 23, thereby improving the anaerobic microorganism concentration. Therefore, in regard to this sixth embodiment, only the point different from the construction shown in FIG. 3 will be described in detail.

In this sixth embodiment, the sludge is reserved in both the fourth water tank 17 that serves as an anaerobic tank and the condensation tank 23 and thereafter sent back into the second water tank upper portion 11. Therefore, this return sludge has a higher concentration, a longer retention time and a further promoted anaerobic state as compared with those of the waste water treatment equipment shown in FIG. 3, and the anaerobic microorganisms are sufficiently propagated. Therefore, the denitrifying reaction can progress more effectively than the construction shown in FIG. 3 if an appropriate amount of organic matter exists in the waste water in the upper portion 11 of the second water tank 3.

(Seventh Embodiment)

Figure 8:
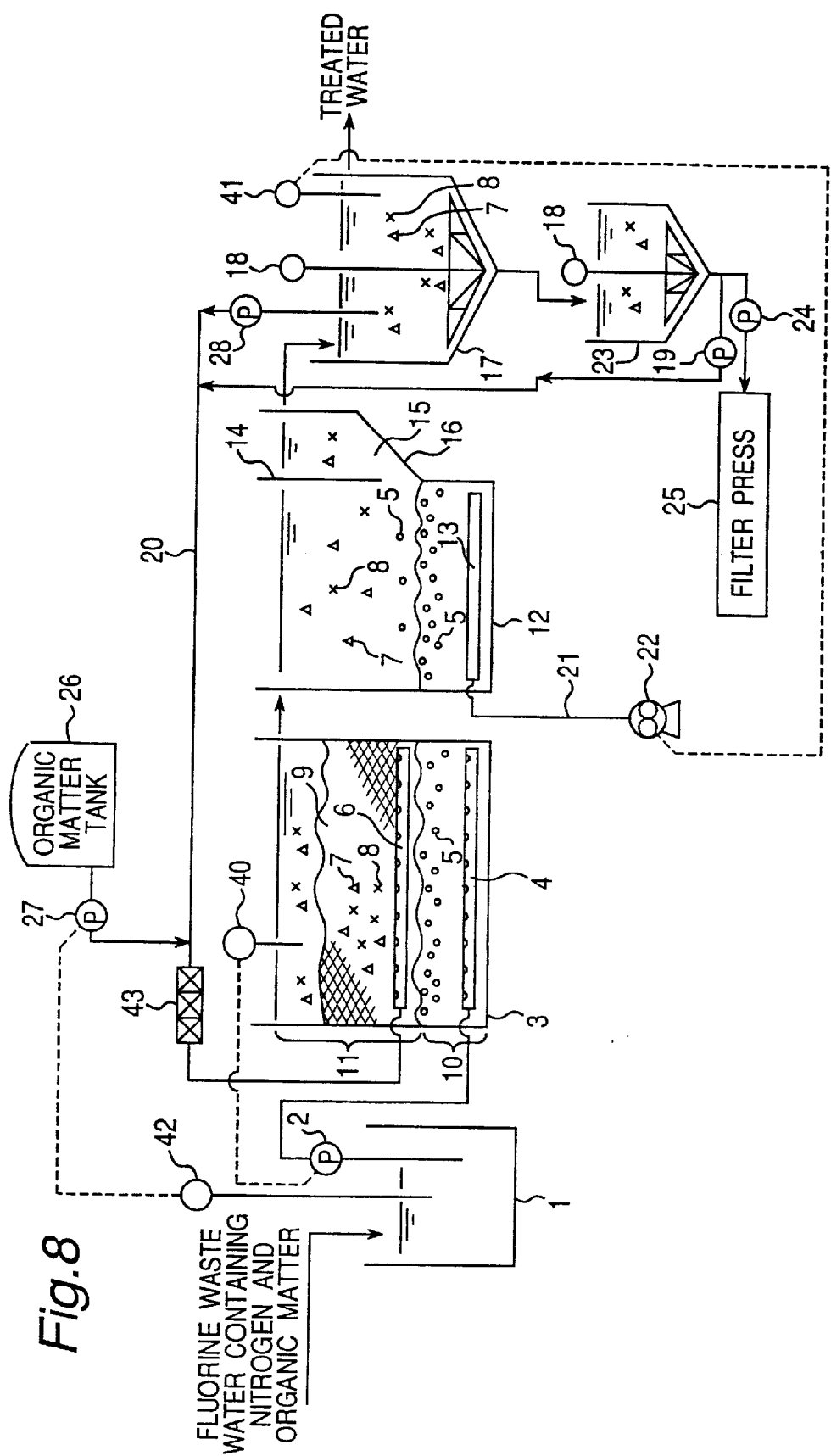
FIG. 8 is a schematic view for explaining a waste water treatment method according to a seventh embodiment of the present invention.

Next, FIG. 8 shows the construction of waste water treatment equipment of the seventh embodiment for executing the waste water treatment method of the present invention. This waste water treatment equipment differs from the waste water treatment equipment of the fourth embodiment shown in FIG. 5 only in that the present equipment sends the sludge back into the second water tank upper portion 11 not from the fourth water tank 17 but from the condensation tank 23, thereby improving the anaerobic microorganism concentration. Therefore, in regard to this seventh embodiment, only the point different from FIG. 5 will be described in detail.

In this seventh embodiment, the sludge is reserved in both the fourth water tank 17 that serves as an anaerobic tank and the condensation tank 23 and thereafter sent back into the second water tank upper portion 11. Therefore, this return sludge has a higher concentration, a longer retention time and a further promoted anaerobic state as compared with those of the fourth embodiment shown in FIG. 5, and the anaerobic microorganisms are sufficiently propagated. Therefore, the denitrifying reaction can progress more effectively than the fourth embodiment of FIG. 5 if an appropriate amount of organic matter exists in the waste water in the second water tank upper portion 11.

(Eighth Embodiment)

Figure 9:
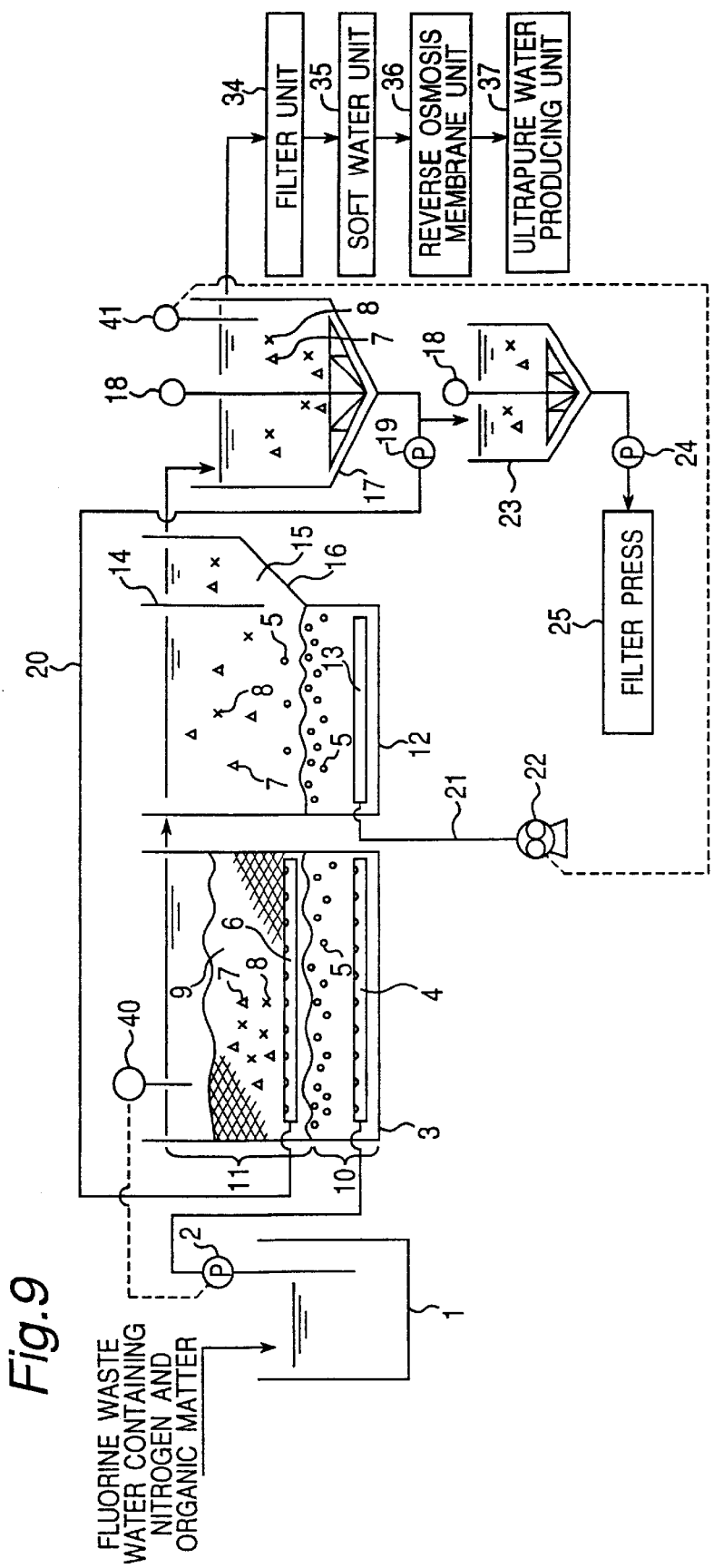
FIG. 9 is a schematic view for explaining a waste water treatment method according to an eighth embodiment of the present invention.

Next, FIG. 9 shows the construction of waste water treatment equipment of the eighth embodiment for executing the waste water treatment method of the present invention. This waste water treatment equipment differs from the aforementioned first embodiment only in that the present equipment is provided with a filter unit 34, a soft water unit 35, a reverse osmosis membrane unit 36 and a ultrapure water producing unit 37 in addition to the construction of the first embodiment shown in FIG. 1. Therefore, in regard to this eighth embodiment, only the different point will be described in detail.

In this eighth embodiment, the treated water from which the nitrogen, organic matter and fluorine have been removed is introduced as water to be treated from the fourth water tank 17 into the filter unit 34. In this embodiment, anthracite is used as a filter material to be placed in the filter unit 34. Then, the suspended solid included in the water to be treated is removed by the filter unit 34. The water to be treated from which the suspended solid has been removed by the filter unit 34 is introduced into the soft water unit 35.

The nitrate nitrogen in the waste water has already been removed from the waste water through denitrification in the form of $N_2$ gas dissipated into the atmospheric air in the stage preceding the filter unit 34. Therefore, as a matter of course, the electrical conductivity is reduced to allow the waste water to be easily reused.

Next, in the soft water unit 35, principally the calcium ions and the like dissolved in the water to be treated are removed. Then, the remaining ions, organic matter, microorganisms and the like are removed by the reverse osmosis membrane unit 36. It is to be noted that this reverse osmosis membrane unit 36 has a generic sterilizing unit, a pH controlling unit, a microfilter and the like.

As described above, this eighth embodiment is able to remove the nitrogen, organic matter and fluorine from the waste water by the first water tank 1 through the fourth water tank 17 and remove the suspended solid, remaining ions, remaining organic matter, microorganisms and the like by the filter unit 34, soft water unit 35 and reverse osmosis membrane unit 36. Then, the treated water from which the nitrogen, organic matter, fluorine, suspended solid, remaining ions, remaining organic matter, microorganisms and the like are securely removed is introduced into the ultrapure water producing unit 37 so as to obtain a ultrapure water.

(Ninth Embodiment)

Figure 10:
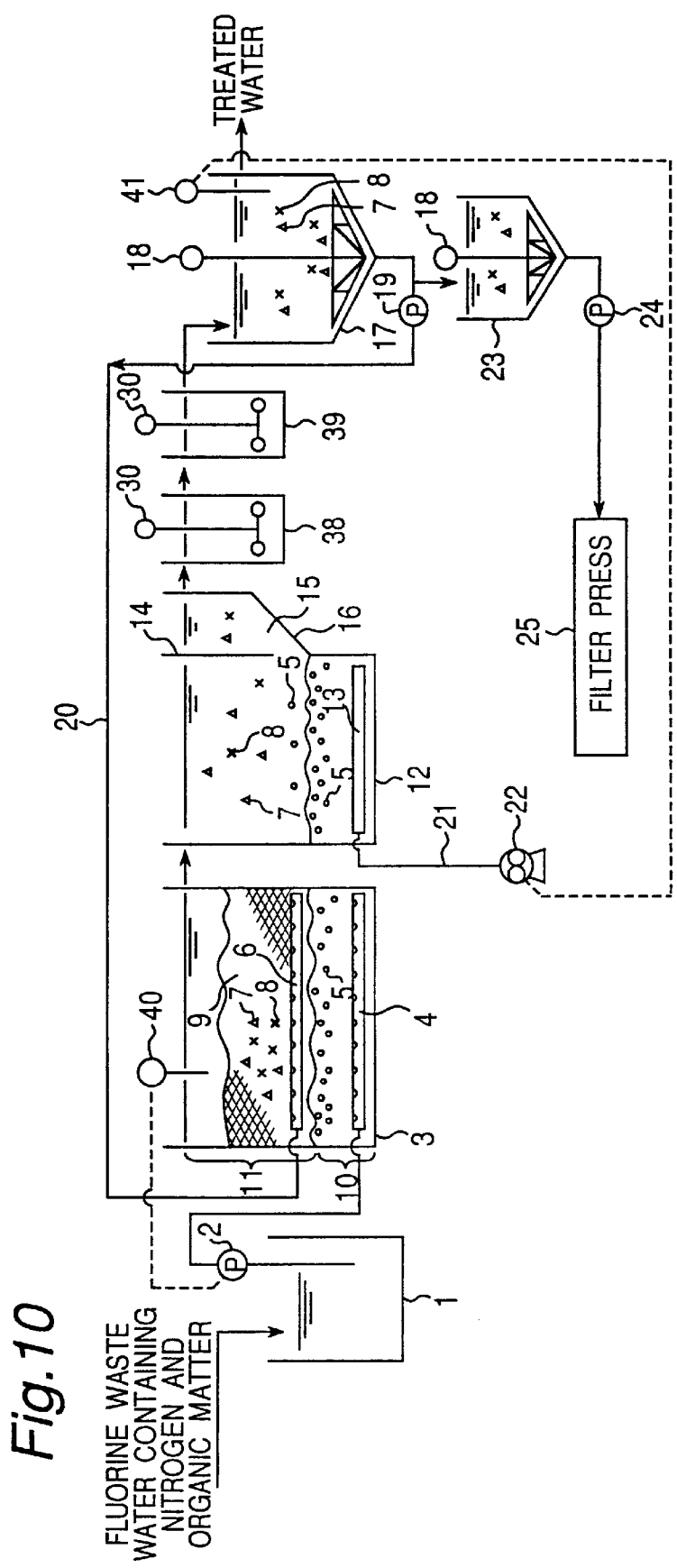
FIG. 10 is a schematic view for explaining a waste water treatment method according to a ninth embodiment of the present invention.
Figure 11:
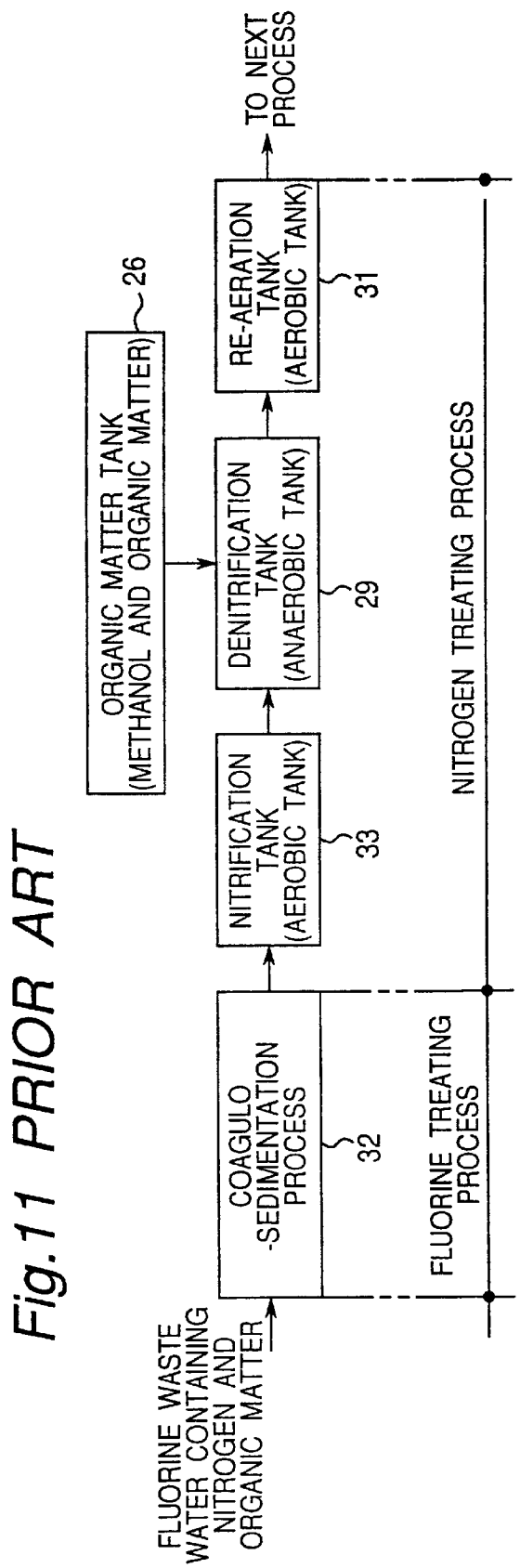
FIG. 11 is a block diagram showing treatment of fluorine waste water containing nitrogen and organic matter of a prior art example.
Figure 12:
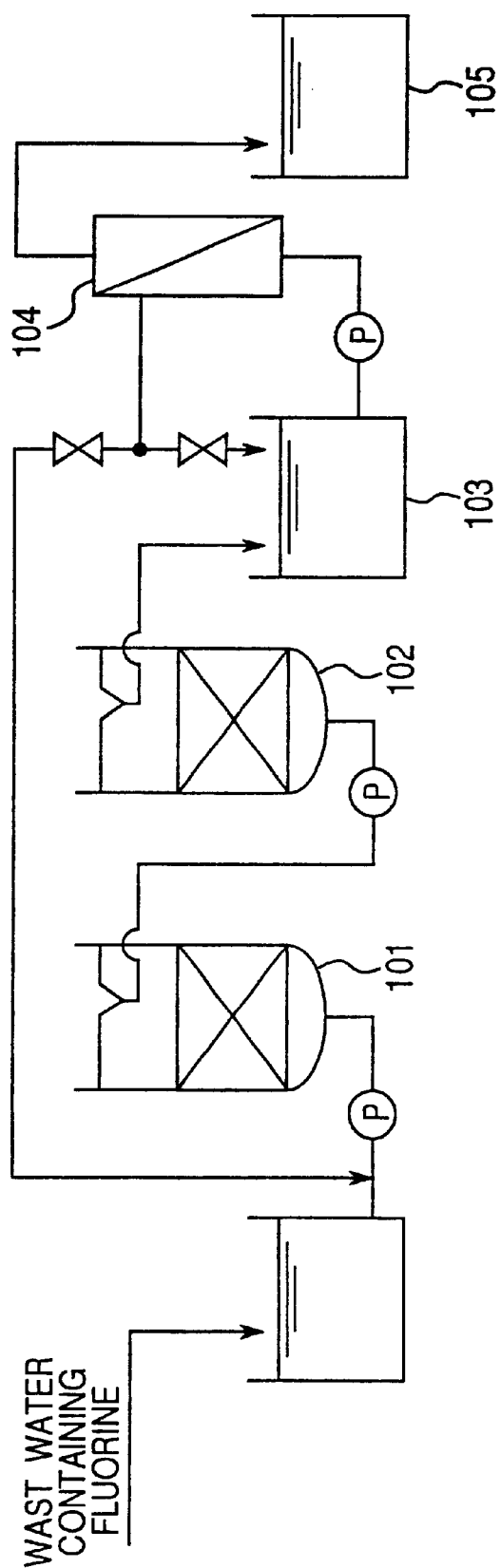
FIG. 12 is a diagram showing a defluorinating unit utilizing calcium carbonate mineral of a prior art example.
Figure 13:
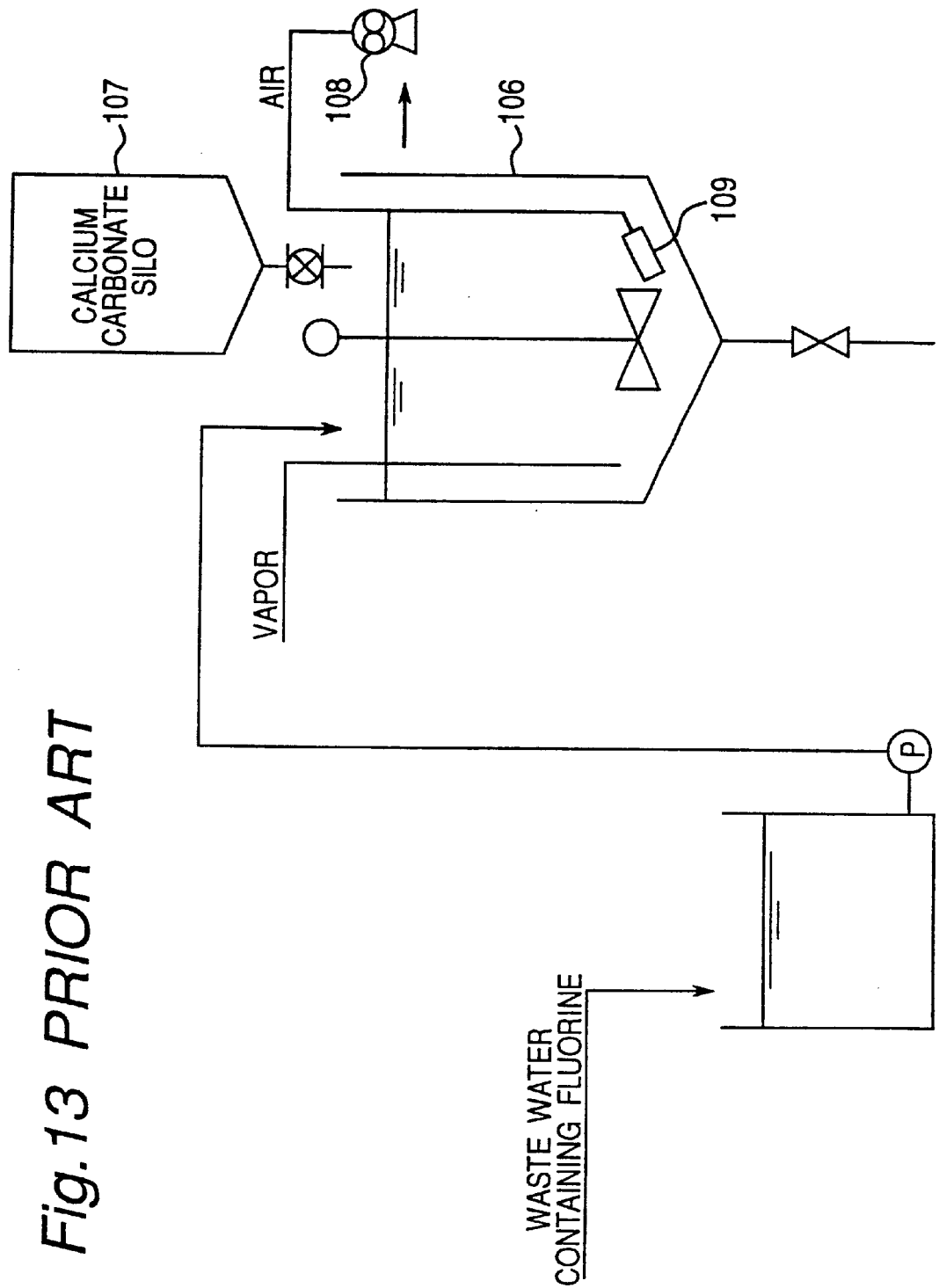
FIG. 13 is a diagram showing a defluorinating unit utilizing calcium carbonate mineral of another prior art example.
Figure 14:
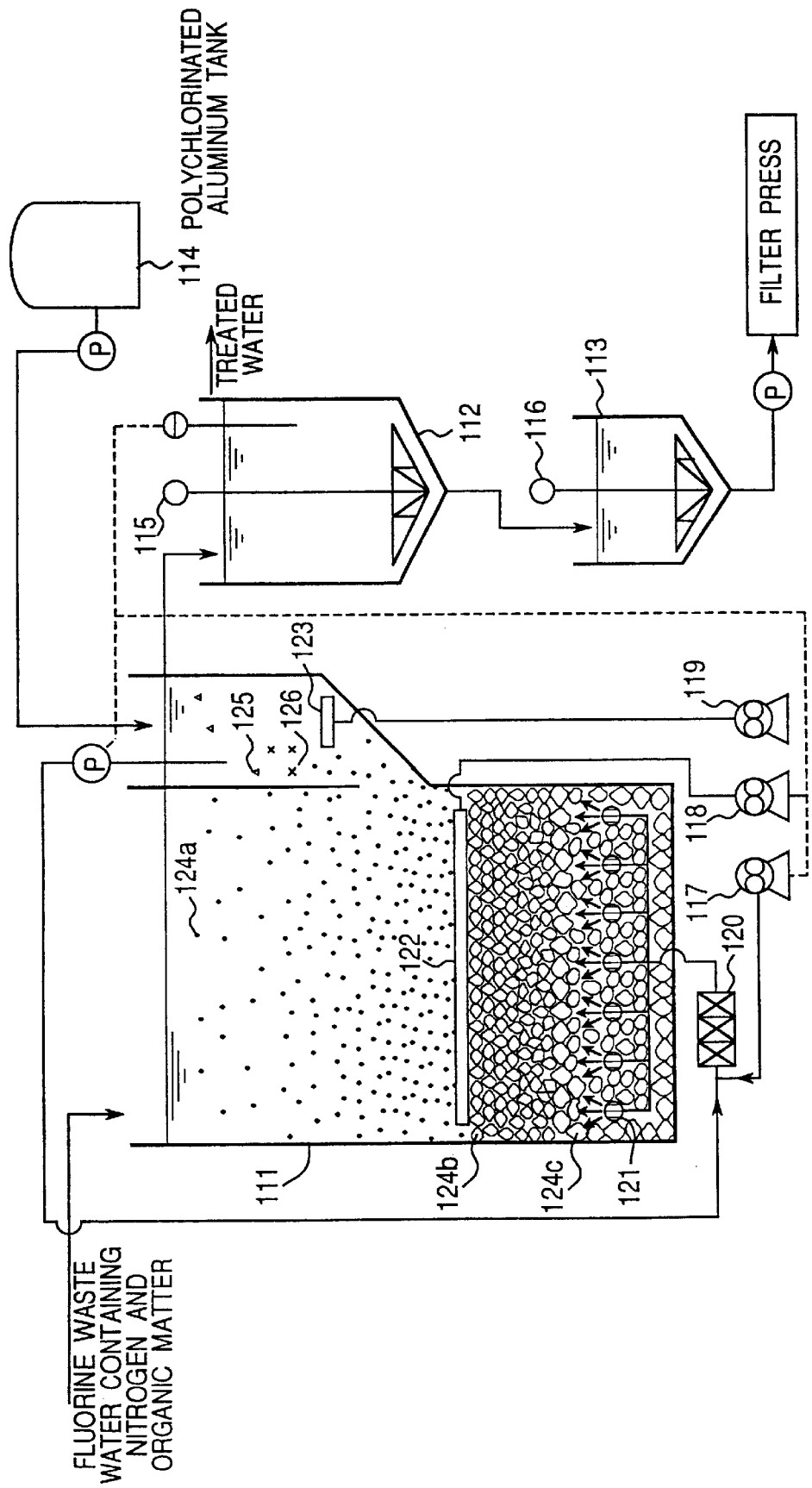
FIG. 14 is a diagram showing waste water treatment equipment for treating fluorine waste water containing organic matter of a prior art example.
Figure 15:
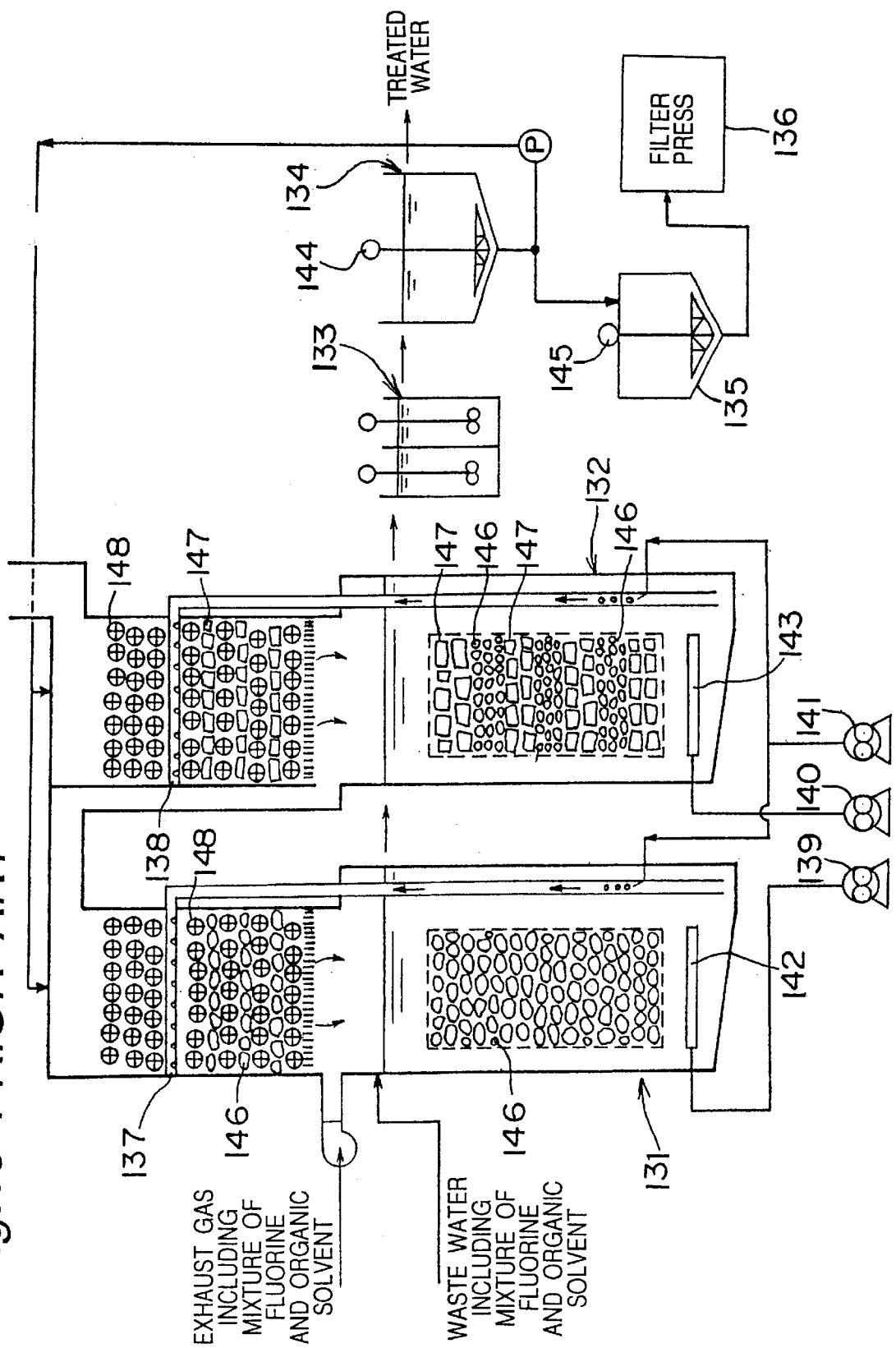
FIG. 15 is a diagram showing waste water treatment equipment for treating fluorine waste water containing organic matter of another prior art example.
Figure 16:
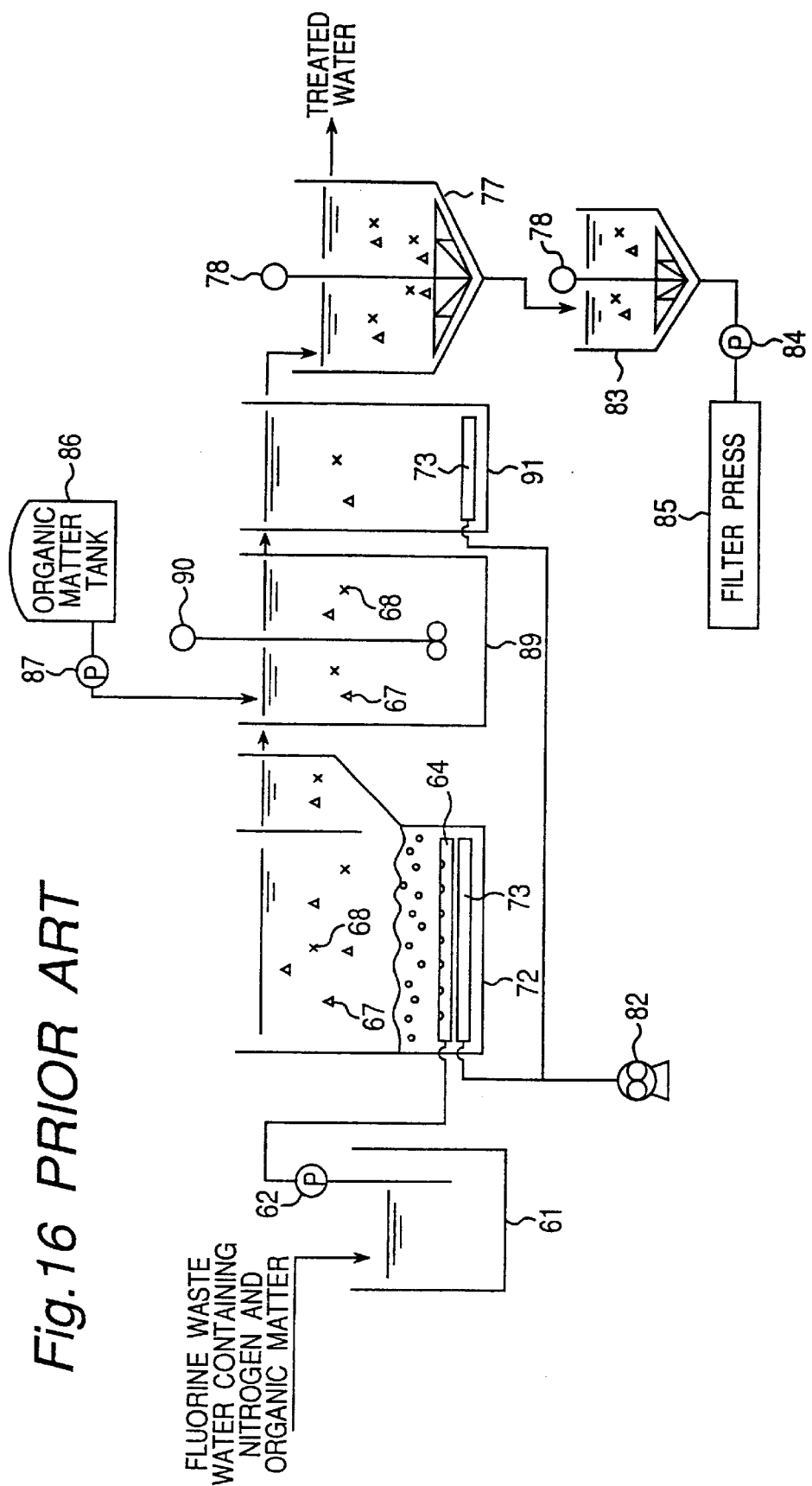
FIG. 16 is a diagram showing waste water treatment equipment for treating fluorine waste water containing nitrogen and organic matter of a prior art example.

Next, FIG. 10 shows the construction of waste water treatment equipment of the ninth embodiment for executing the waste water treatment method of the present invention. This waste water treatment equipment adds a reaction tank 38 and a condensation tank 39 to the rear end of the third water tank 12 of the waste water treatment equipment of the first embodiment shown in FIG. 1 and thereafter reintroduces the waste water into the fourth water tank 17. Therefore, only the point that the waste water is introduced into the reaction tank 38 and the condensation tank 39 subsequent to the third water tank 12, which is different from the first embodiment, will be described in detail.

In the case where the phosphor attributed to the phosphoric acid to be used in the semiconductor plant enters the waste water, the waste water treatment method by the waste water treatment equipment shown in FIG. 1 cannot remove the phosphor. Therefore, according to this ninth embodiment, a small amount of slaked lime is added to the reaction tank 38 and a macromolecular coagulant is added to the condensation tank 39 so as to surely remove the phosphor in the waste water.

The above slaked lime is dissolved into water in a slaked lime silo (not shown) and thereafter poured into the reaction tank 38 by opening and closing an electromagnetic valve (not shown) mounted on a piping loop of a slaked lime circulating pump (not shown). The above macromolecular coagulant is poured into the condensation tank 39 by a macromolecular coagulant pouring pump (not shown) provided for a macromolecular coagulant tank (not shown).

FIRST EXAMPLE

A concrete example of the waste water treatment using the aforementioned waste water treatment method will be described next. In this example, waste water treatment equipment having a construction identical to that of the waste water treatment equipment shown in FIG. 1 was used. Then, tank capacity setting was performed so that the first water tank 1 had a capacity of about 1 $m^3$, the second water tank 3 had a capacity of about 2 $m^3$, the third water tank 12 excluding the separation chamber 15 had a capacity of about 1 $m^3$, the separation chamber 15 had a capacity of about 0.25 $m^3$, the fourth water tank 17 had a capacity of about 1.5 $m^3$ and the condensation tank 23 had a capacity of about 1 $m^3$. This waste water treatment equipment was used for treating a fluorine waste water containing nitrogen and organic matter having pH 2.2, a total nitrogen concentration of 24 ppm, a COD concentration of 10 ppm as an organic matter concentration and a fluorine concentration of 212 ppm. As a result, the pH could be made to be 6.8, the total nitrogen concentration could be made to be 8 ppm, or one third of the concentration prior to the treatment, the COD concentration as an organic matter concentration could be made to be 2.5 ppm, or one fourth of the concentration prior to the treatment and the fluorine concentration could be made to be 14 ppm, or one fifteenth of the concentration prior to the treatment.

SECOND EXAMPLE

A concrete example of the waste water treatment using the waste water treatment method having the aforementioned ultrapure water producing method will be described next. In this second example, waste water treatment equipment having a construction identical to that of the waste water treatment equipment shown in FIG. 9 was used. Then, tank capacity setting was performed so that the first water tank 1 had a capacity of about 1 $m^3$, the second water tank 3 had a capacity of about 2 $m^3$, the third water tank 12 excluding the separation chamber 15 had a capacity of about 1 $m^3$, the separation chamber 15 had a capacity of about 0.25 $m^3$, the fourth water tank 17 had a capacity of about 1.5 $m^3$ and the condensation tank 23 had a capacity of about 1 $m^3$. Each of the filter unit 34 and the soft water unit 35 had a capacity of about 0.8 $m^3$, and the reverse osmosis membrane unit 36 was comprised of one unit. This waste water treatment equipment was used for treating a fluorine waste water containing nitrogen and organic matter having pH 2.3, a total nitrogen correction of 24 ppm, a COD concentration of 10 ppm as an organic matter concentration and a fluorine concentration of 215 ppm. As a result, the pH obtained from the reverse osmosis membrane unit 36 could be made to be 7.2, the total nitrogen concentration could be made to be 2 ppm, the COD concentration could be made to be 0.1 ppm and the fluorine concentration could be made to be 0.2 ppm. Further, waste water having an electrical conductivity of 820 $\mu$s/cm was treated. As a result, the electrical conductivity of the treated water obtained from the reverse osmosis membrane unit 36 could be made to be not greater than 260 $\mu$s/cm.

It is to be noted that the calcium carbonate mineral 5 to be placed in the lower portion 10 of the second water tank 3 and the third water tank 12 may also be another reactive filler capable of treating fluorine. The condensation tank 23 is not always necessary. However, if the condensation tank 23 is provided, nitrogen can be more efficiently treated by the highly concentrated anaerobic microorganisms.

The invention being thus described, it will be obvious that the same may be varied in many ways. Such variations are not be regarded as a departure from the sprit and scope of the invention, and all such modifications as would be obvious to one skilled in the art are intended to be included within the scope of the following claims.

What is claimed is:

1. A waste water treatment method comprising the steps of:

introducing waste water containing fluorine, nitrogen and organic matter into a raw water tank;

introducing the waste water in the raw water tank into an anaerobic tank that has a lower portion containing calcium carbonate mineral and an upper portion in which microorganic sludge is concentrated;

introducing the waste water treated in the anaerobic tank into an aerobic tank that contains the calcium carbonate mineral and has a stirring means; and introducing the waste water treated in the aerobic tank into a sedimentation tank for obtaining precipitation of sludge and treated water.

2. A waste water treatment method as claimed in claim 1, wherein the sludge precipitated in the sedimentation tank is sent back to the anaerobic tank so as to be circulated.

3. A waste water treatment method as claimed in claim 2, wherein the sludge precipitated in the sedimentation tank contains anaerobic microorganisms that are entrapped by calcium fluoride to be fixed to the calcium fluoride.

4. A waste water treatment method as claimed in claim 1, wherein the waste water is introduced into the lower portion of the anaerobic tank and the sludge precipitated in the sedimentation tank is introduced into an intermediate portion of the anaerobic tank.

5. A waste water treatment method as claimed in claim 4, wherein a sludge zone is formed in the upper portion of the anaerobic tank.

6. A waste water treatment method as claimed in claim 1, wherein the upper portion of the anaerobic tank has a suspended solid concentration of 10,000 ppm or more.

7. A waste water treatment method as claimed in claim 1, wherein the calcium carbonate mineral filled in the anaerobic tank and the aerobic tank is granular.

8. A waste water treatment method as claimed in claim 5, wherein denitrifying bacteria are propagated in the sludge zone.

9. A waste water treatment method as claimed in claim 1, further comprising the steps of:

filtering the treated water from the sedimentation tank;

removing calcium ions from the treated water which has been filtered;

further removing remaining ions, remaining organic matter and microorganisms from the treated water; and processing the treated water into ultrapure water.

10. A waste water treatment method as claimed in claim 9, wherein the remaining ions, the remaining organic matter and the microorganisms are removed from the treated water with a reverse osmosis membrane which is made of a composite membrane.

11. A waste water treatment method as claimed in claim 1, wherein an amount of the waste water to be introduced from the raw water tank into the anaerobic tank is controlled according to a dissolved oxygen concentration inside the anaerobic tank.

12. A waste water treatment method as claimed in claim 1, wherein an amount of aeration air to aerate the aerobic tank is controlled according to a fluorine concentration in the waste water inside the sedimentation tank.

13. A waste water treatment method as claimed in claim 1, wherein organic matter that serves as a hydrogen donor is supplied to the anaerobic tank according to a COD concentration in the waste water inside the raw water tank.

14. Waste water treatment equipment comprising: an anaerobic tank including a lower portion which contains calcium carbonate mineral and into which waste water is introduced and an upper portion which contains anaerobic microorganic sludge, a raw water tank into which the waste water for the anaerobic tank is introduced; an aerobic tank which has a stirring means and contains the calcium carbonate mineral and into which the waste water from the anaerobic tank is introduced; and a sedimentation tank into which the waste water from the aerobic tank is introduced.

15. Waste water treatment equipment as claimed in claim 14, and further comprising:

a filter unit filtering the treated water from the sedimentation tank;

a soft water unit removing calcium ions in the treated water from the filter unit;

a reverse osmosis membrane unit removing remaining ions, remaining organic matter and microorganisms in the treated water from the soft water unit; and an ultrapure water producing unit processing the treated water from the reverse osmosis membrane unit into ultrapure water.

16. Waste water treatment equipment as claimed in claim 14, and further comprising:

an organic matter tank storing organic matter;

a COD concentration meter measuring a COD concentration of the waste water inside the raw water tank;

an organic matter tank pump supplying the organic matter to the anaerobic tank according to the COD concentration of the waste water inside the raw water tank.

* * * * *